United States Patent
Seo et al.

(10) Patent No.: US 12,069,672 B2
(45) Date of Patent: Aug. 20, 2024

(54) METHOD FOR MONITORING SCHEDULING INFORMATION IN WIRELESS COMMUNICATION SYSTEM, AND DEVICE USING METHOD

(71) Applicant: LG ELECTRONICS INC., Seoul (KR)

(72) Inventors: Inkwon Seo, Seoul (KR); Daesung Hwang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 784 days.

(21) Appl. No.: 17/267,214

(22) PCT Filed: Aug. 9, 2019

(86) PCT No.: PCT/KR2019/010084
§ 371 (c)(1),
(2) Date: Feb. 9, 2021

(87) PCT Pub. No.: WO2020/032693
PCT Pub. Date: Feb. 13, 2020

(65) Prior Publication Data
US 2021/0314997 A1 Oct. 7, 2021

Related U.S. Application Data

(60) Provisional application No. 62/719,127, filed on Aug. 16, 2018, provisional application No. 62/719,574, filed on Aug. 17, 2018.

(30) Foreign Application Priority Data

Aug. 10, 2018 (KR) .................. 10-2018-0093949

(51) Int. Cl.
H04W 72/23 (2023.01)
(52) U.S. Cl.
CPC .................. *H04W 72/23* (2023.01)
(58) Field of Classification Search
CPC ..... H04W 72/23; H04L 5/0053; H04L 5/0094
See application file for complete search history.

(56) References Cited

U.S. PATENT DOCUMENTS 9,370,001 B2 * 6/2016 Kim ................ H04W 72/23
9,497,775 B2 * 11/2016 Chung ............. H04L 1/1861
(Continued)

FOREIGN PATENT DOCUMENTS

EP 2337260 A2 * 6/2011 ........... H04L 5/001
EP 4109804 A1 * 12/2022 ......... H04L 27/0006
KR 20170095275 8/2017

OTHER PUBLICATIONS

PCT International Application No. PCT/KR2019/010084, International Search Report dated Dec. 20, 2019, 4 pages.
(Continued)

*Primary Examiner* — Chi H Pham
*Assistant Examiner* — Vladislav Y Agureyev
(74) *Attorney, Agent, or Firm* — LEE, HONG, DEGERMAN, KANG & WAIMEY

(57) ABSTRACT

A method for monitoring scheduling information in a wireless communication system, and a device using the method are provided. The method: receives first configuration information about a search space of a first cell and second configuration information about the search space of a second cell; and monitors scheduling information for scheduling the second cell in the search space of the first cell, wherein the number of physical downlink control channel (PDCCH) candidates per aggregation level (AL) to be used in the (Continued)

search space of the first cell is determined on the basis of the second configuration information.

15 Claims, 27 Drawing Sheets

(56) References Cited

U.S. PATENT DOCUMENTS

| | | | | |
|---|---|---|---|---|
| 10,820,269 | B2* | 10/2020 | Lu | H04W 52/0216 |
| 10,951,383 | B2* | 3/2021 | Lu | H04L 5/0094 |
| 11,929,859 | B2* | 3/2024 | Babaei | H04W 72/23 |
| 2013/0215875 | A1* | 8/2013 | Yang | H04W 72/1273 370/336 |
| 2015/0029910 | A1* | 1/2015 | He | H04L 5/0094 370/280 |
| 2015/0271691 | A1* | 9/2015 | Lee | H04W 72/23 370/328 |
| 2015/0280882 | A1* | 10/2015 | Lee | H04L 5/001 370/329 |
| 2017/0374569 | A1* | 12/2017 | Lee | H04L 5/00 |
| 2019/0090218 | A1* | 3/2019 | Noh | H04W 72/23 |
| 2019/0149380 | A1* | 5/2019 | Babaei | H04W 72/0446 370/330 |
| 2019/0150183 | A1* | 5/2019 | Aiba | H04W 24/10 370/336 |
| 2019/0158205 | A1* | 5/2019 | Sheng | H04L 5/0048 |
| 2019/0215870 | A1* | 7/2019 | Babaei | H04L 5/0092 |
| 2019/0222357 | A1* | 7/2019 | Huang | H04L 5/0094 |
| 2019/0306700 | A1* | 10/2019 | Lin | H04W 72/23 |
| 2019/0313390 | A1* | 10/2019 | Cheng | H04L 5/0053 |
| 2019/0342907 | A1* | 11/2019 | Huang | H04W 72/23 |
| 2019/0349180 | A1* | 11/2019 | Lu | H04L 27/2607 |
| 2020/0045696 | A1* | 2/2020 | Huang | H04L 5/10 |
| 2020/0374967 | A1* | 11/2020 | Nogami | H04W 72/0446 |

OTHER PUBLICATIONS

Huawei et al., "Remaining issues on search space," 3GPP TSG RAN WG1 Meeting #93, R1-1805881, May 2018, 9 pages.
Mediatek Inc., "Remaining Issues on Search Space," 3GPP TSG RAN WG1 Meeting #93, R1-1806779, May 2018, 7 pages.
Nokia et al., "Remaining details on search space," 3GPP TSG RAN WG1 #92bis, R1-1805517, Apr. 2018, 16 pages.
Huawei et al., "Summary of remaining issues on PDCCH monitoring with TP," 3GPP TSG RAN WG1 Meeting #92bis, R1-1803710, Apr. 2018, 7 pages.

* cited by examiner

METHOD FOR MONITORING SCHEDULING INFORMATION IN WIRELESS COMMUNICATION SYSTEM, AND DEVICE USING METHOD

CROSS-REFERENCE TO RELATED APPLICATIONS

This application is the National Stage filing under 35 U.S.C. 371 of International Application No. PCT/KR2019/010084, filed on Aug. 9, 2019, which claims the benefit of earlier filing date and right of priority to Korean Application No. 10-2018-0093949, filed on Aug. 10, 2018, and also claims the benefit of U.S. Provisional Application Nos. 62/719,127 filed on Aug. 16, 2018, and 62/719,574 filed on Aug. 17, 2018, the contents of which are all incorporated by reference herein in their entirety.

BACKGROUND OF THE DISCLOSURE

Field of the Disclosure

The present disclosure relates to a method for monitoring scheduling information in a wireless communication system and an apparatus using the method.

Related Art

As more and more communication devices require more communication capacity, there is a need for improved mobile broadband communication compared to the existing radio access technology. Further, massive MTC (Machine Type Communications), which provides various services by connecting many devices and objects, is one of the major issues to be considered in the next generation communication. In addition, communication system design considering reliability/latency sensitive service/UE is being discussed. Likewise, the introduction of the next generation radio access technology considering enhanced mobile broadband communication, massive MTC, URLLC (Ultra-Reliable and Low Latency Communication) is discussed. In the present disclosure, the technology is called New RAT or NR for convenience. NR is also referred to as a fifth generation (5G) system.

In NR as well, carrier aggregation for aggregating a plurality of cells is supported, and different types of cross-carrier scheduling are supported for a scheduling cell to which scheduling information is transmitted and a scheduled cell which is scheduled by the scheduling information.

In cross-carrier scheduling, configuration information for a search space may be provided to the scheduling cell and the scheduled cell. Also, numerologies are configured for the scheduling cell and the scheduled cell independently. In this case, it is not clear how the number of PDCCH (physical downlink control channel) candidates (for each aggregation level) of the scheduled cell shall be determined when cross-carrier scheduling is applied.

Moreover, in a case where a plurality of cells with different numerologies are configured for the same terminal, there will be a problem with how the maximum number of blind decoding (BD) attempts and/or the maximum number of channel estimation (CE) attempts shall be determined for a cell with a specific numerology.

SUMMARY

The present disclosure provides a method for monitoring scheduling information in a wireless communication system and an apparatus using the method.

In one aspect, provided is a method for monitoring scheduling information in a wireless communication system, the method comprising: receiving first configuration information for a search space of a first cell and second configuration information for a search space of a second cell; and monitoring scheduling information for the second cell in the search space of the first cell. The number of physical downlink control channel (PDCCH) candidates per aggregation level (AL) to be used in the search space of the first cell is determined based on the second configuration information.

The second configuration information may comprise no other information than information indicating the number of PDCCH candidates per aggregation level.

The number of PDCCH candidates per aggregation level may comprise a value of the number of PDCCH candidates for each aggregation level.

Based on monitoring the scheduling information for the second cell in the search space of the first cell, any other information than the number of PDCCH candidates per aggregation level may be determined based on the first configuration information.

The other information may comprise the ID (identity) of a control resource set (CORESET) related with the search space.

Based on monitoring scheduling information for the first cell in the search space of the first cell, the monitoring in the search space of the first cell may be performed based on the first configuration information.

The first cell and the second cell may be cells having the same subcarrier spacing.

The first cell and the second cell may be cells having different subcarrier spacings.

The first configuration information and the second configuration information may be received through an RRC (radio resource control) signal.

In another aspect, provided is a user equipment (UE) comprising: a transceiver for transmitting and receiving a radio signal; and a processor operatively coupled to the transceiver, wherein the processor is configured to receive first configuration information for a search space of a first cell and second configuration information for a search space of a second cell and to monitor scheduling information for the second cell in the search space of the first cell, wherein a number of physical downlink control channel (PDCCH) candidates per aggregation level (AL) to be used in the search space of the first cell is determined based on the second configuration information.

In still another aspect, provided is a processor for a wireless communication device in a wireless communication system, wherein the processor controls the wireless communication device to receive first configuration information for a search space of a first cell and second configuration information for a search space of a second cell and to monitor scheduling information for the second cell in the search space of the first cell, wherein a number of physical downlink control channel (PDCCH) candidates per aggregation level (AL) to be used in the search space of the first cell is determined based on the second configuration information.

Configuration information for a search space for each cell may be provided to a UE for which a plurality of cells are configured. If self-scheduling is applied, scheduling information monitoring may be performed based on search space configuration information for a corresponding cell. However, in the case of cross-carrier scheduling, it is not clear based on which cell's search space configuration information scheduling information monitoring is performed, which leads to ambiguity. This is even more so especially when different numerologies are applied to a scheduling cell and a scheduled cell. The present disclosure does not have the above-mentioned ambiguity problem by providing a method for monitoring scheduling information in cross-carrier scheduling. Moreover, it is possible to reduce the signaling overhead of search space configuration information for a scheduled cell.

DESCRIPTION OF EXEMPLARY EMBODIMENTS

Figure 1:
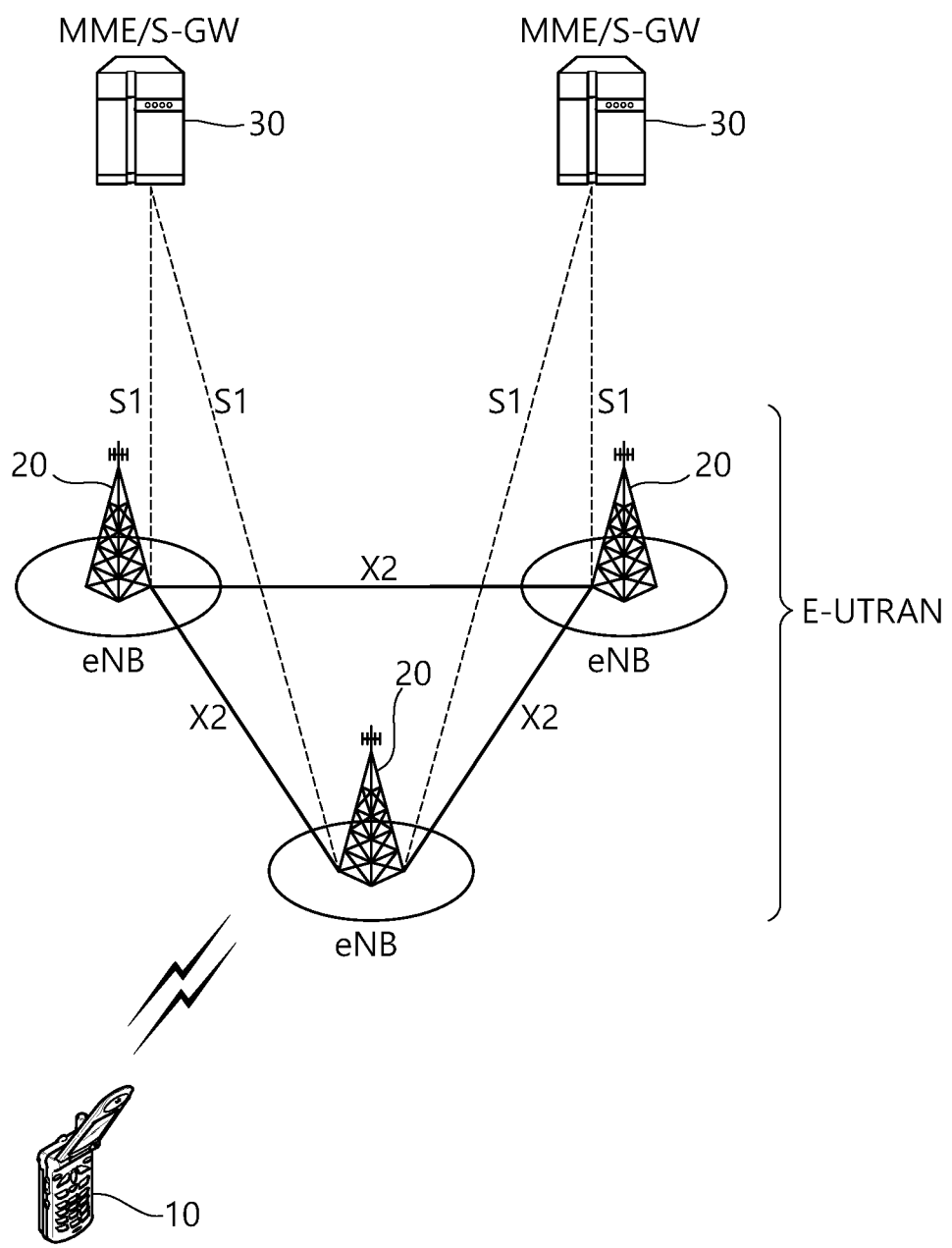
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
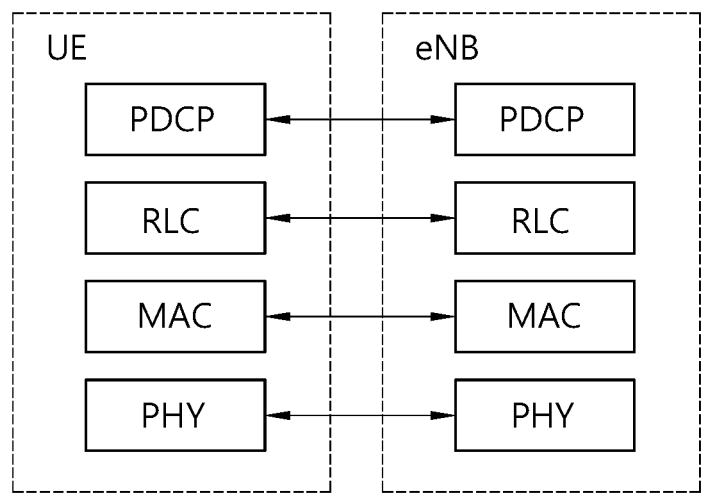
FIG. 2 is a diagram showing a wireless protocol architecture for a user plane.
Figure 3:
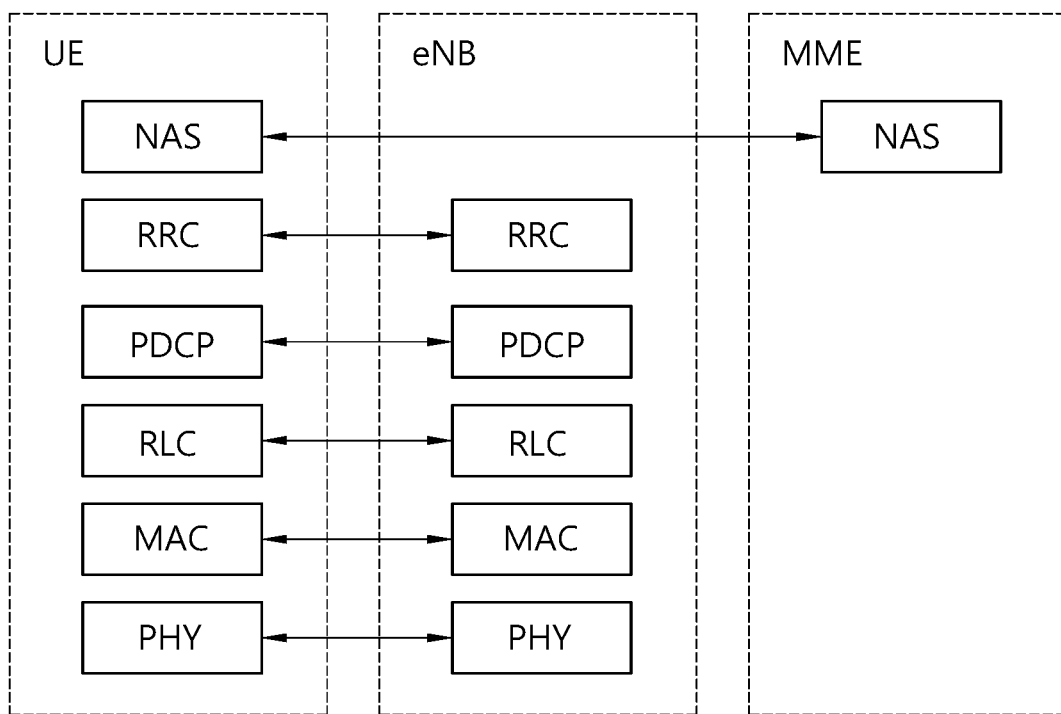
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer (=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
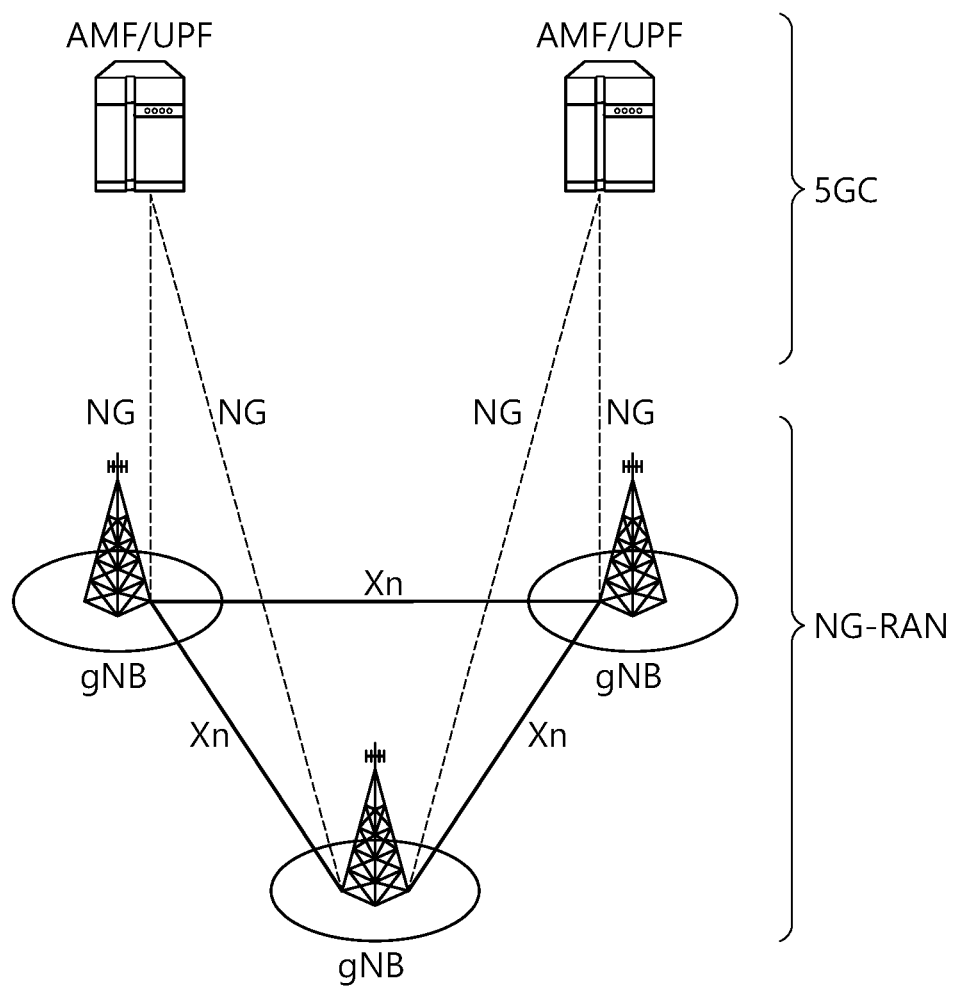
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
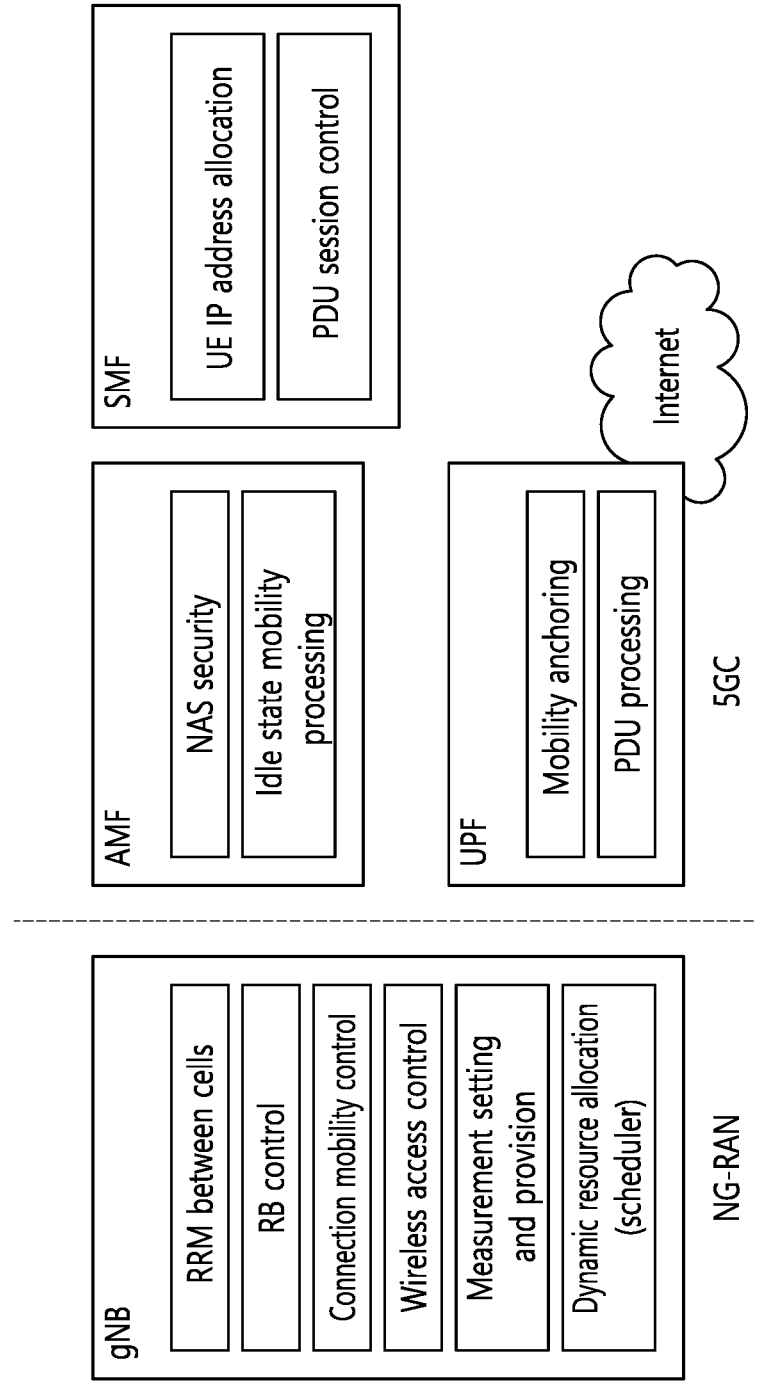
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
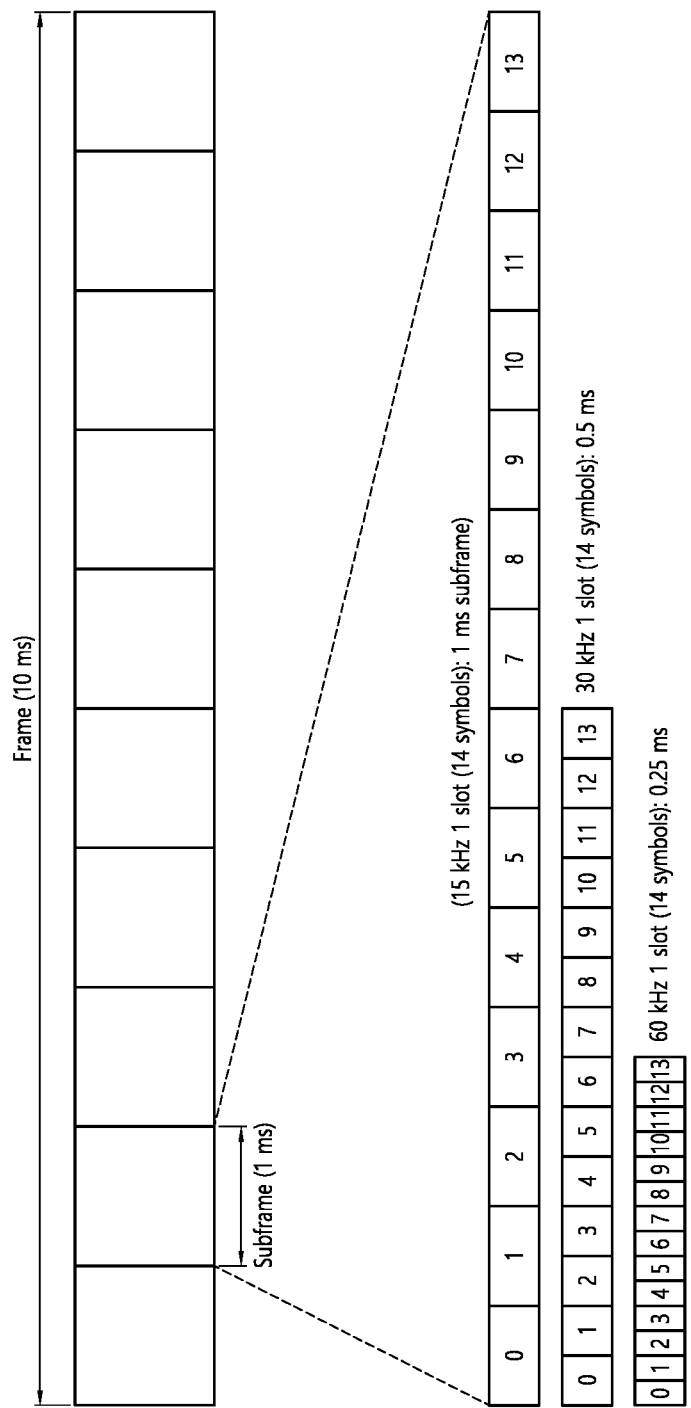
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration μ.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{frame,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 6, μ=0, 1, 2 is illustrated.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring means decoding each PDCCH candidate according to a downlink control information (DCI) format. The terminal monitors, according to the corresponding search space set, the set of PDCCH candidates in one or more CORESET on the active DL BWP of each activated serving cell for which PDCCH monitoring is configured.

In NR, a new unit called a control resource set (CORESET) may be introduced. The terminal may receive the PDCCH in the CORESET.

Figure 7:
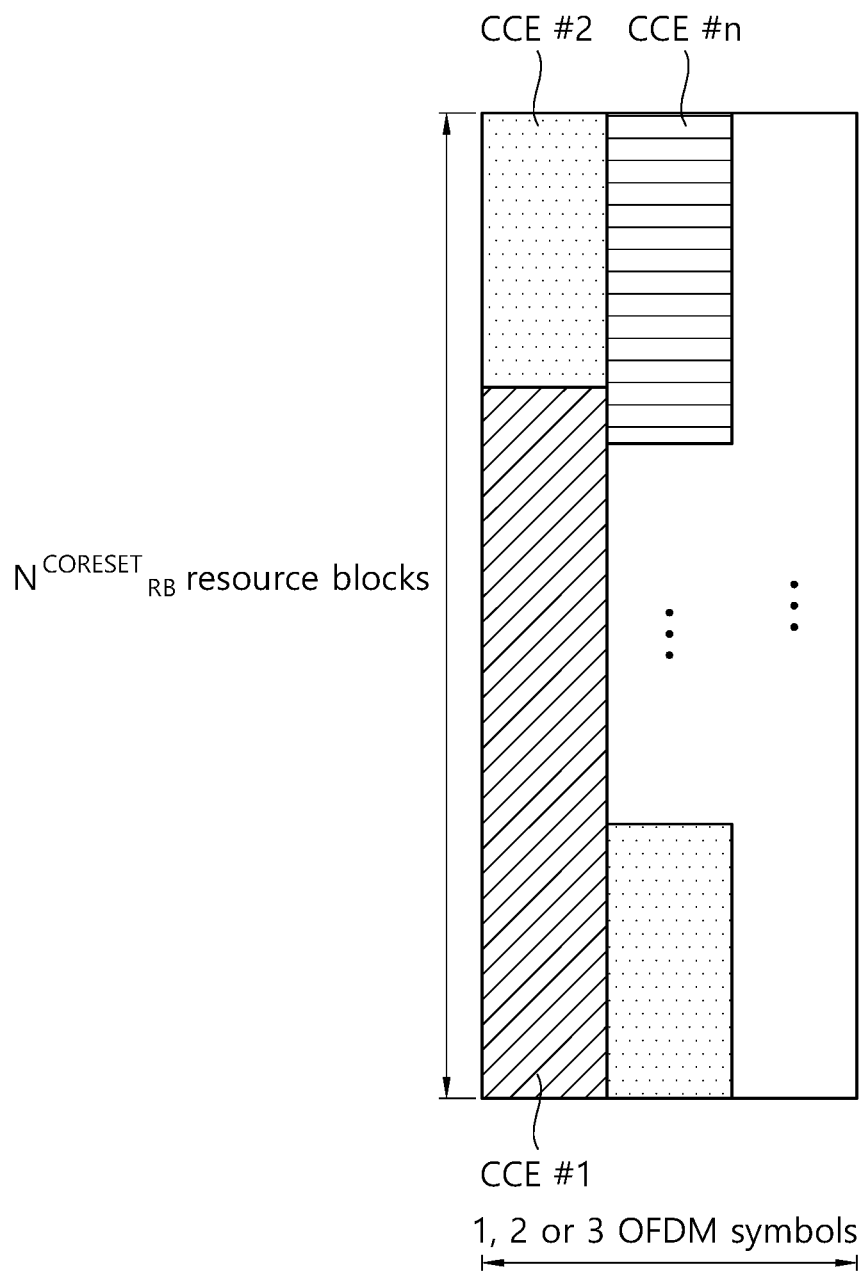
FIG. 7 illustrates CORESET.

FIG. 7 illustrates CORESET.

Referring to FIG. 7, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as a PDCCH candidate.

A plurality of CORESETs may be configured for the terminal.

Figure 8:
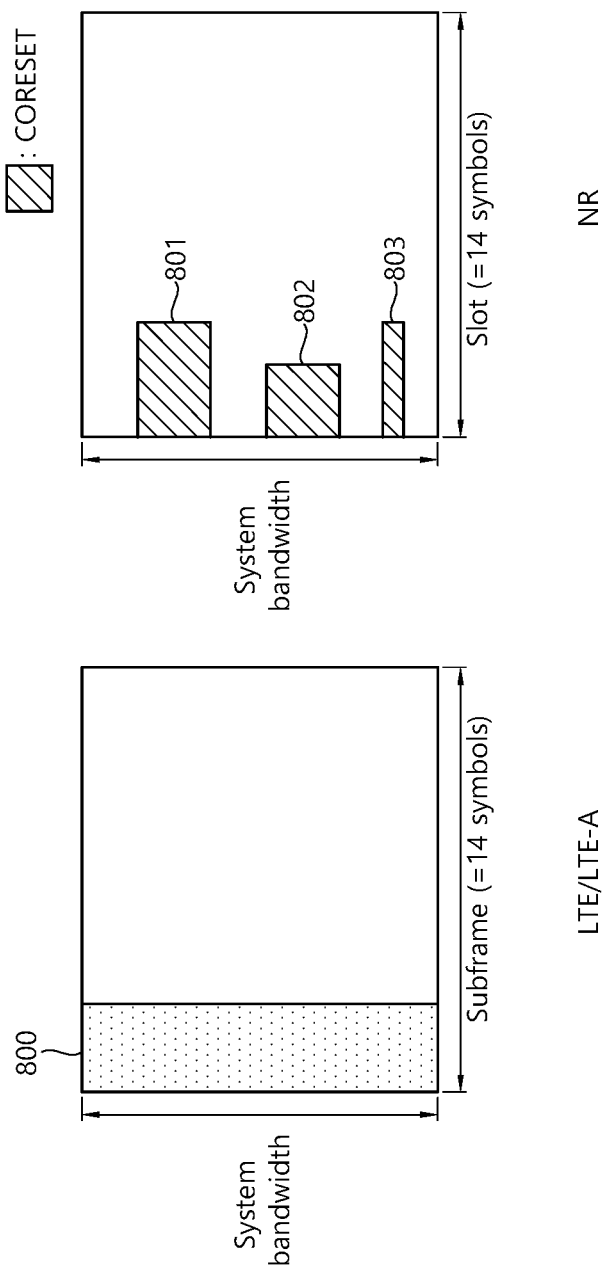
FIG. 8 is a diagram illustrating a difference between a related art control region and the CORESET in NR.

FIG. 8 is a diagram illustrating a difference between a related art control region and the CORESET in NR.

Referring to FIG. 8, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the terminal and may use only a portion, rather than the entirety of the system bandwidth. The BS may allocate the CORESET to each UE and may transmit control information through the allocated CORESET. For example, in FIG. 8, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 9:
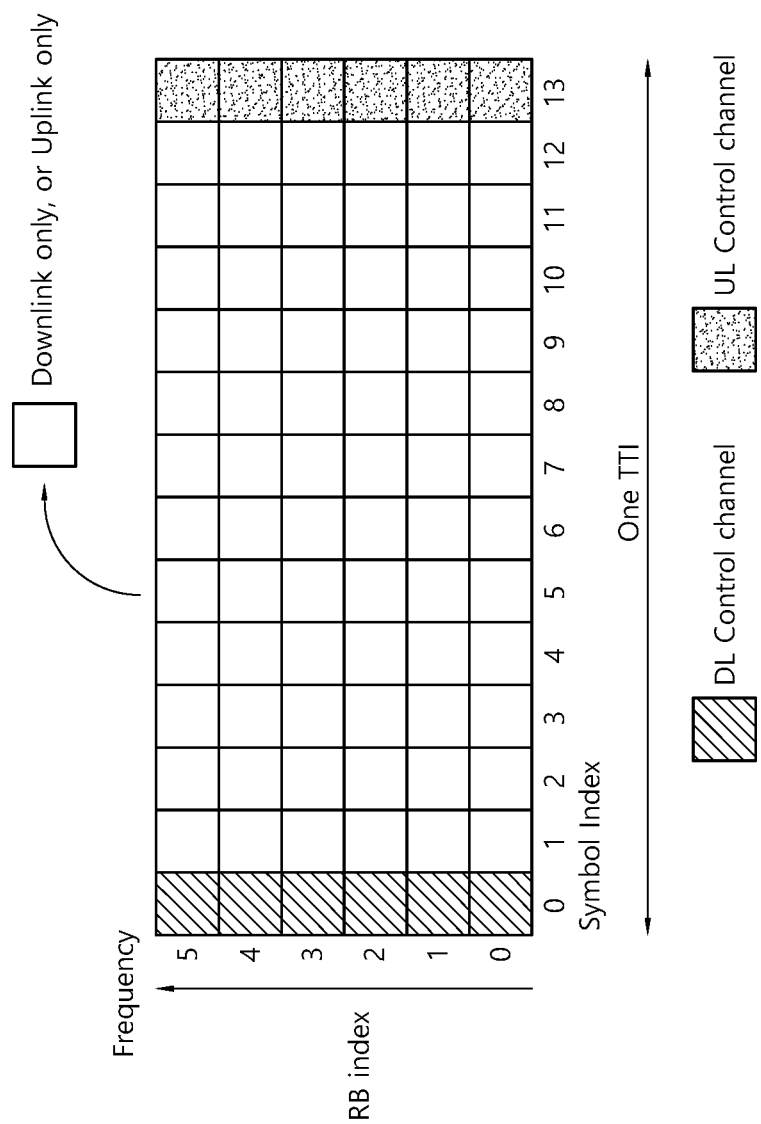
FIG. 9 illustrates an example of a frame structure for new radio access technology.

FIG. 9 illustrates an example of a frame structure for new radio access technology.

In NR, a structure in which a control channel and a data channel are time-division-multiplexed within one TTI, as shown in FIG. 9, can be considered as a frame structure in order to minimize latency.

In FIG. 9, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 10:
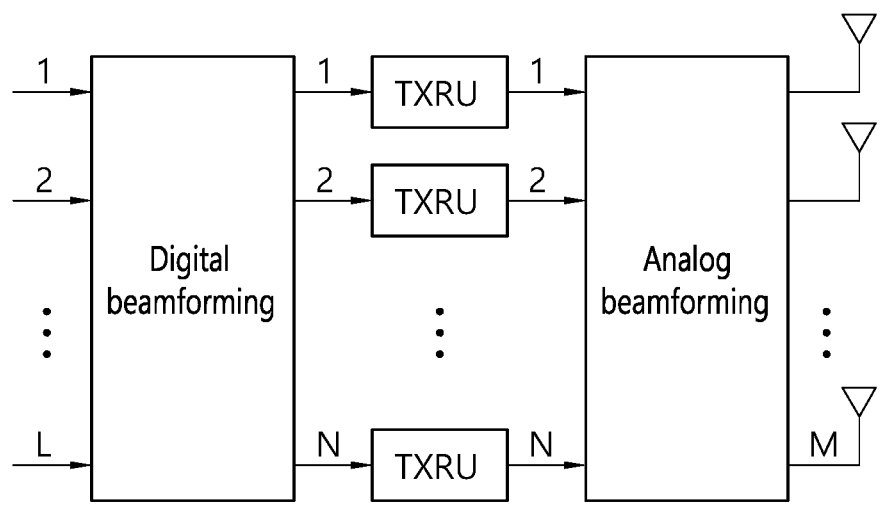
FIG. 10 is an abstract schematic diagram illustrating hybrid beamforming from the viewpoint of TXRUs and physical antennas.

FIG. 10 is an abstract schematic diagram illustrating hybrid beamforming from the viewpoint of TXRUs and physical antennas.

In FIG. 10, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 10, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 11:
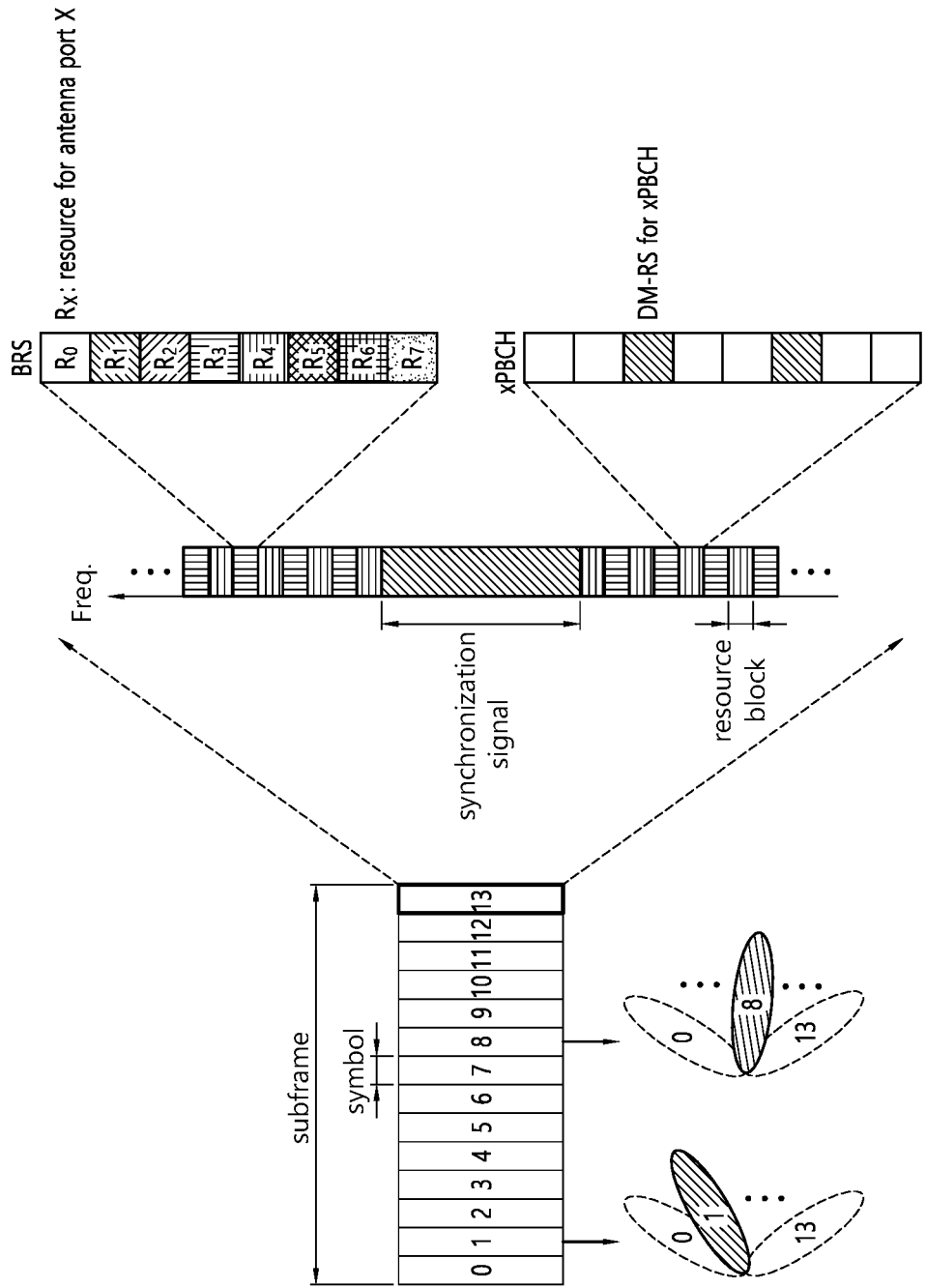
FIG. 11 illustrates the beam sweeping operation for a synchronization signal and system information in a downlink (DL) transmission procedure.

FIG. 11 illustrates the beam sweeping operation for a synchronization signal and system information in a downlink (DL) transmission procedure.

In FIG. 11, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam, as illustrated in FIG. 8, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

Figure 12:
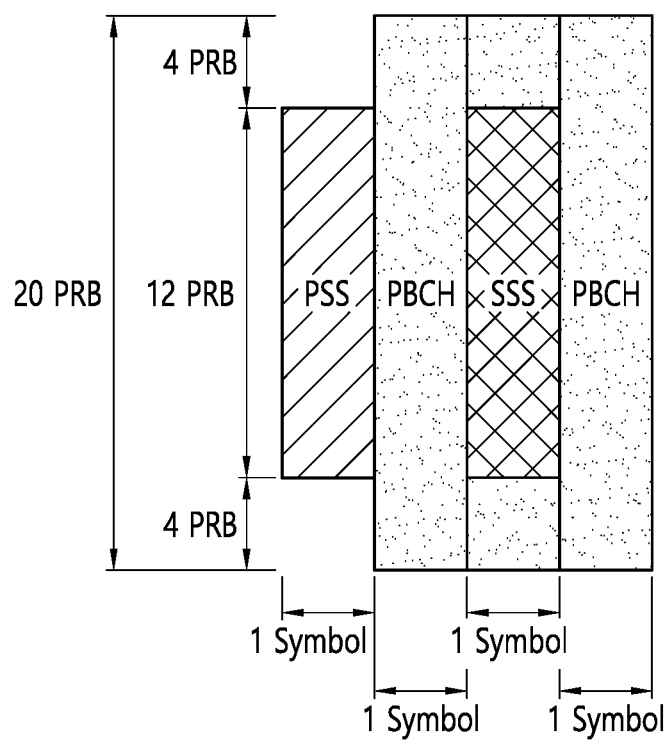
FIG. 12 illustrates a synchronization signal block (SSB) in NR.

FIG. 12 illustrates a synchronization signal block (SSB) in NR.

Referring to FIG. 12, in NR, a synchronization signal block (SSB(=synchronization signal and physical broadcast channel(PBCH)) may be composed of four OFDM symbols in the time domain, numbered in the ascending order from 0 to 3 within the SSB; and a primary synchronization signal (PSS), secondary synchronization signal (SSS), and PBCH associated with demodulation reference signal (DMRS) may be mapped to the symbols. Here, a synchronization signal block may be termed as an SS/PBCH block (or SSB for short).

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, beams may be used for transmission and reception. If reception performance of a current serving beam is degraded, a process of searching for a new beam through the so-called Beam Failure Recovery (BFR) may be performed.

Since the BFR is not a process of declaring an error/failure of a link between a network and a UE, it can be assumed that a connection with a current serving cell is maintained even if a BFR process is performed. In the BFR process, measurements are made on different beams set by the network (the beams can be represented by a CSI-RS port or an synchronization signal block (SSB) index, etc.), and the best beam for the UE can be selected. The UE can perform the BFR process by performing a RACH process associated with the corresponding beam with respect to the beam having a good measurement result.

Hereinafter, a transmission configuration indicator (TCI) state will be described. The TCI state may be set for each CORESET of the control channel and may determine a parameter for determining the receive (Rx) beam of the UE based on the TCI state.

For each downlink bandwidth portion (DL BWP) of the serving cell, the UE may be configured with up to three CORESETs. Also, for each CORESET, the UE may be provided with the following information.

1) The CORESET index p (e.g., one of 0 to 11, the index of each CORESET in BWPs of one serving cell may be uniquely determined)
2) PDCCH DM-RS scrambling sequence initialization value
3) The interval in the time domain of the CORESET (which may be given in symbol units)
4) Resource block set
5) CCE-to-REG mapping parameters
6) An antenna port quasi-co-location indicating quasi co-location (QCL) information of the DM-RS antenna port for PDCCH reception in each CORESET (from the set of antenna port quasi co-location provided by the upper layer parameter called "TCI-state")
7) Presence or absence of a transmission configuration indication (TCI) field for the specific DCI format transmitted by the PDCCH in the CORESET.

Hereinafter, the QCL will be described. If the characteristics of the channel on which symbols are transmitted on one antenna port can be inferred from the characteristics of the channel on which the symbols on the other antenna port are transmitted, then the two antenna ports are said to be in a quasi co-location (QCL). For example, when two signals A and B are transmitted from the same transmit antenna array with the same/similar spatial filter applied, the two signals may experience the same/similar channel condition. Upon receipt of one of the two signals, the receiver will be able to detect other signals using the channel characteristics of the received signal.

In this sense, the fact that A and B are quasi co-located (QCL) means that A and B have undergone similar channel conditions, and therefore, the channel information estimated to detect A is also useful for detecting B. Here, the channel condition may be defined by, for example, a Doppler shift, a Doppler spread, an average latency, a latency spread, a spatial reception parameter, and the like.

The TCI-State parameter associates one or two downlink reference signals with the corresponding QCL type (QCL types A, B, C, D, see Table 4).

TABLE 4

| QCL Type | Description |
|---|---|
| QCL-TypeA | Doppler shift, Doppler spread, average latency, latency spread, |
| QCL-TypeB | Doppler shift, Doppler spread, |
| QCL-TypeC | Doppler shift, average latency, |
| QCL-TypeD | Spatial Rx parameter |

Each TCI-State may include a parameter to set the QCL relationship between one or two downlink reference signals and the DM-RS port of the PDSCH (or PDCCH) or CSI-RS port of the CSI-RS resource.

On the other hand, in each DL BWP set to the UE in one serving cell, the UE can receive up to 10 search space sets. For each search space set, the UE may be provided with at least one of the following information.

1) Search space set index s (0≤s<40), 2) The association between the CORESET P and the search space set s, 3) PDCCH monitoring period and PDCCH monitoring offset (slot unit), 4) PDCCH monitoring pattern in slot (For example, in the slot for PDCCH monitoring, the first symbol of the CORESET is indicated), 5) The number of slots in which the search space set s exists, 6) Number of PDCCH candidates per CCE aggregation level, 7) Information indicating whether search space set s is CSS or USS, etc.

In NR, CORESET #0 can be set by PBCH (or UE dedicated signaling or PSCell setting or BWP setting for handover). A search space (SS) set #0 set by the PBCH may have a different monitoring offset (e.g., a slot offset, a symbol offset) for each SSB associated therewith. This may be necessary to minimize the search space occasion that the UE should monitor. It may also be necessary to provide a sweeping control/data area for control/data transmission according to each beam so that communication with the UE can be continuously performed in a situation where the best beam of the UE changes dynamically.

Figure 13:
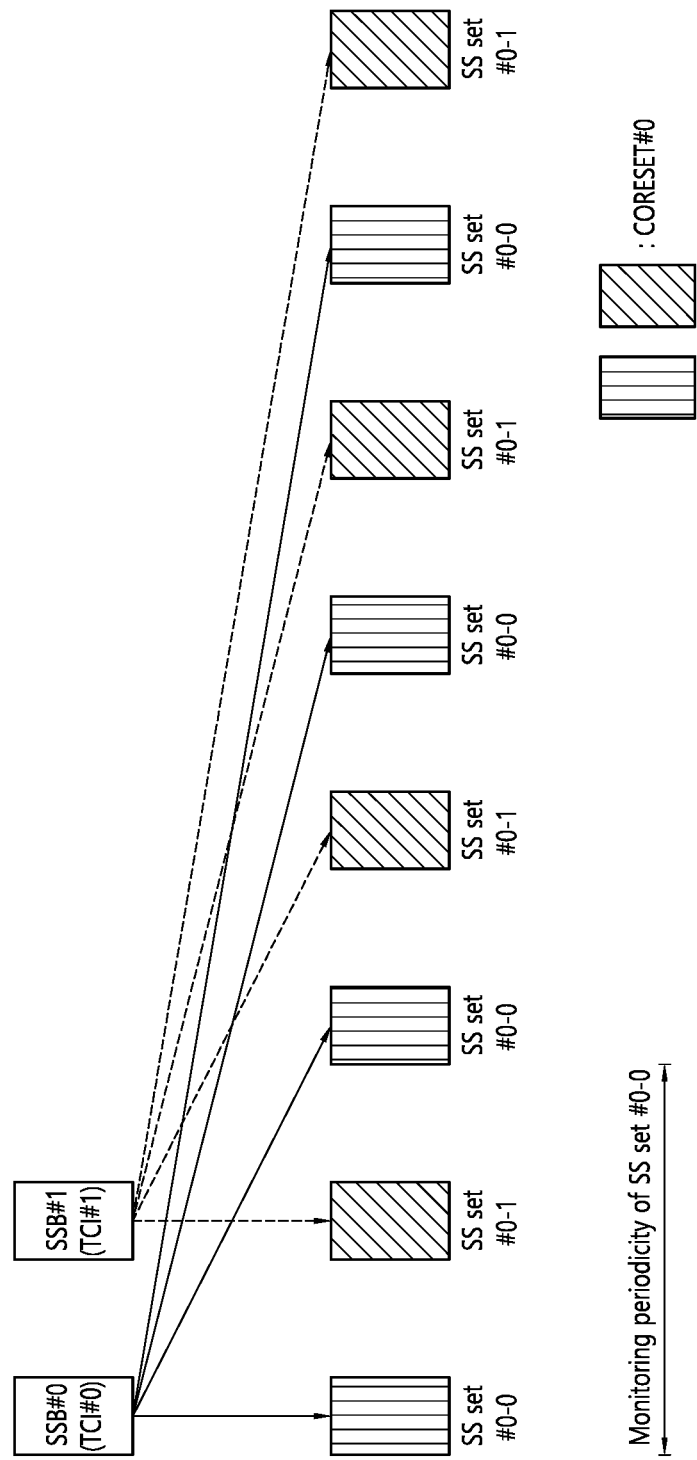
FIG. 13 illustrates an association between SSB and CORESET #0 and a search space set (SS set).

FIG. 13 illustrates an association between SSB and CORESET #0 and a search space set (SS set).

Referring to FIG. 13, the CORESET #0 may be a CORESET for monitoring the DCI that carries Remaining System Information (RMSI) scheduling information. Among the CORESET settings for the CORESET #0, the position and size in the frequency domain and the duration in the time domain may be set by a PBCH (e.g., a master information block (MIB) transmitted over a PBCH, and the rest of the CORESET configurations may be fixed, which may be the characteristic of the CORESET #0.

The CORESET #0 may be allocated a common search space (CSS(s)) for other system information (OSI), paging, and random access in addition to the RMSI, and may also be used for transmitting the UE-specific search space (USS) or the UE-dedicated PDCCH. When the search space set for OSI, paging, and random access is separately set, the search space may use another search space index.

As another feature of CORESET #0, there may not be an explicit setting for the transmission configuration indication (TCI) state. As described above, the TCI state may mean information necessary for the UE to set up the receive beam in NR. The TCI state at CORESET #0 may be determined by the SSB associated with the corresponding CORESET/search space set. There may exist a CORESET #0 and a search space set #0 associated with each SSB. Each UE may perform measurement on each SSB and monitor the CORESET #0/search space set #0 associated with the corresponding SSB based on the PBCH information of the SSB having the best measurement result. In FIG. 13, the search space set #0-0, the search space set #0-1, or the like is used to distinguish the search space set #0 by different SSBs. In the search space set #0-X, X means the associated SSB index.

Now, the present disclosure will be described.

NR may support carrier aggregation, self-scheduling, and cross-carrier scheduling.

Figure 14:
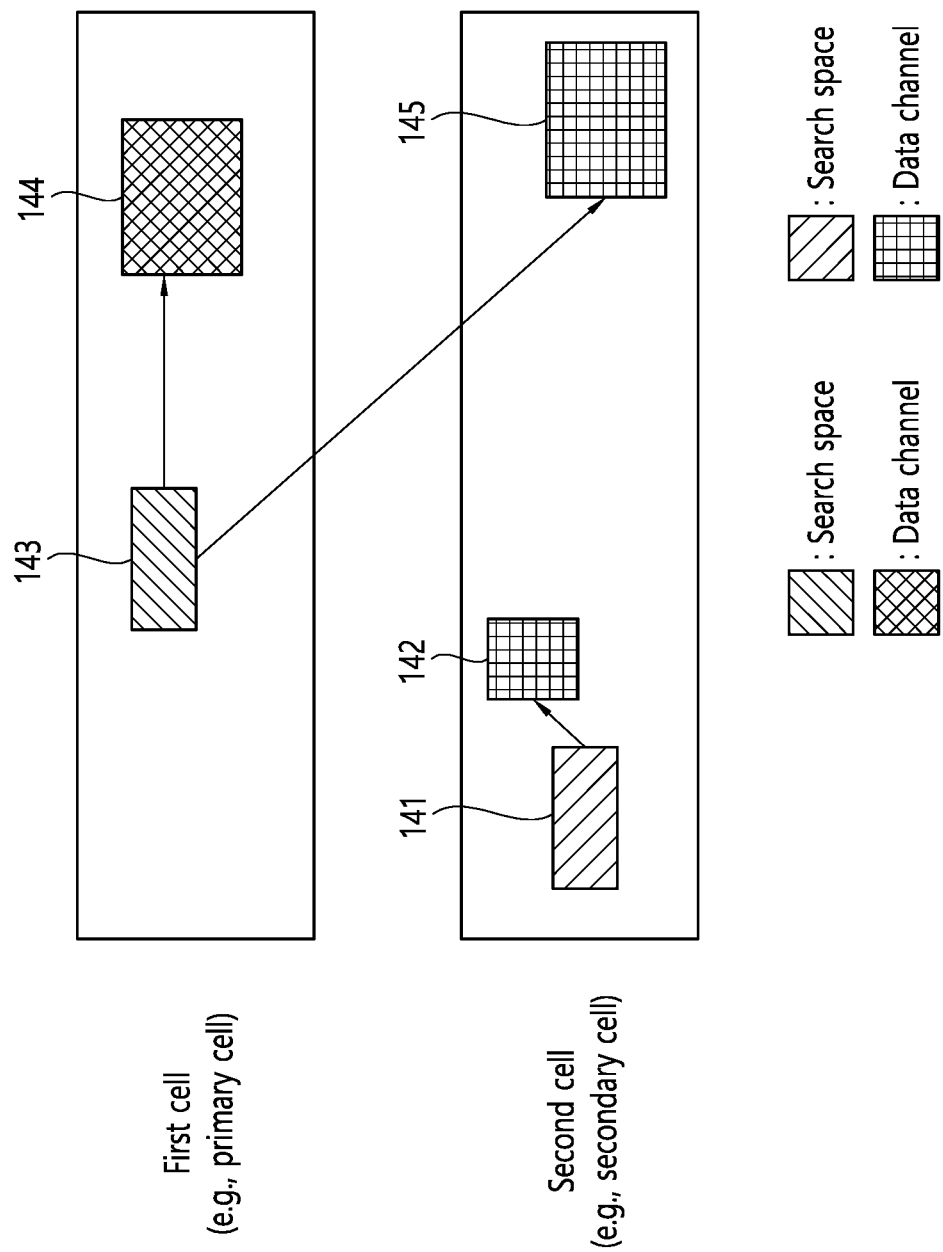
FIG. 14 illustrates cross-carrier scheduling and self-scheduling in a carrier aggregation system.

FIG. 14 illustrates cross-carrier scheduling and self-scheduling in a carrier aggregation system.

Referring to FIG. 14, two cells, that is, a first cell (e.g., primary cell), and a second cell (e.g., secondary cell), may be configured for a UE.

The UE may monitor/receive scheduling information for a data channel 144 of the first cell through a search space 143 of the first cell. The monitoring means decoding each PDCCH candidate according to monitored DCI formats. If scheduling information and a scheduled data channel are received through the same cell in this manner, this may be called self-scheduling. The monitoring also may be referred to as blind decoding (BD).

The UE may monitor/receive scheduling information for a data channel 145 of the second cell through the search space 143 of the first cell. If scheduling information and a scheduled data channel are received through different cells in this manner, this may be called cross-carrier scheduling.

Meanwhile, the UE may monitor/receive scheduling information for a data channel of the second cell through a search space 141 of the second cell. Although FIG. 14 only illustrates that self-scheduling is performed in the second cell, this is not a limitation. That is, self-scheduling and/or cross-carrier scheduling may be performed in the second cell.

In cross-carrier scheduling, how the UE finds the number of PDCCH candidates for each scheduled cell will be an issue. One solution to this problem is that the configuration of a search space (let's say the ID of this search space is s, that is, ID #s) configured on a BWP of a scheduled cell may be used to determine the number of PDCCH candidates per aggregation level to be monitored in a search space (e.g., a search space ID #s for a scheduling cell) of a BWP of a cell that schedules the BWP of the scheduled cell.

The number of candidates per aggregation level (AL) of a scheduled cell in cross-carrier scheduling may be unclear. One solution to this problem is to use the same number of candidates as the number of scheduling cells or specify the number of candidates for the scheduled cell.

The UE may use the same ID between the search spaces configured for the scheduling cell and scheduled cell for the linkage and ignore the CORESET ID configured for the scheduled cell.

The number of candidates configured for the search space of the scheduled cell (hereinafter, the number of PDCCH candidates) may be applied to search spaces of the same index as the scheduling cell. If only one BWP is configured for the scheduled cell, the number of cross-carrier search spaces is not 40 but may be limited to 10.

Specifically, the parameter "nrofCandidates" within a search space set for an active BWP of a scheduled cell(s) may be applied to a corresponding search space set for an active BWP of a scheduling cell(s). The search space set configuration for the scheduled cell may follow the search space set configuration for the scheduling cell, except the aggregation levels/the number of candidates.

The following table shows an example of an information element, i.e., 'SearchSpce'IE, for defining how and where PDCCH candidates are searched for.

TABLE 5

```
- ASN1START
-- TAG-SEARCHSPACE-START
SearchSpace ::=                              SEQUENCE {
    searchSpaceId                                SearchSpaceId,
    controlResourceSetId                         ControlResourceSetId
OPTIONAL, -- Cond SetupOnly
    monitoringSlotPeriodicity AndOffset          CHOICE {
        sl1                                          NULL,
        sl2                                          INTEGER (0..1),
        sl4                                          INTEGER (0..3),
        sl5                                          INTEGER (0..4),
        sl8                                          INTEGER (0..7),
        sl10                                         INTEGER (0..9),
        sl16                                         INTEGER (0..15),
        sl20                                         INTEGER (0..19),
        sl40                                         INTEGER (0..39),
        sl80                                         INTEGER (0..79),
        sl160                                        INTEGER (0..159),
        sl320                                        INTEGER (0..319),
        sl640                                        INTEGER (0..639),
        sl1280                                       INTEGER (0..1279),
        sl2560                                       INTEGER (0..2559)
    }                                            OPTIONAL,
-- Cond Setup
    duration                                     INTEGER (2..2559) OPTIONAL,
-- Need R
    monitoringSymbols WithinSlot                 BIT STRING (SIZE (14)) OPTIONAL,
-- Cond Setup
    nrofCandidates                               SEQUENCE {
        aggregationLevel1                            ENUMERATED {n0, n1, n2, n3, n4, n5, n6, n8},
        aggregationLevel2                            ENUMERATED {n0, n1, n2, n3, n4, n5, n6, n8},
        aggregationLevel4                            ENUMERATED {n0, n1, n2, n3, n4, n5, n6, n8},
        aggregationLevel8                            ENUMERATED {n0, n1, n2, n3, n4, n5, n6, n8},
        aggregationLevel16                           ENUMERATED {n0, n1, n2, n3, n4, n5, n6, n8}
    }                                            OPTIONAL, --
Cond Setup
    searchSpaceType                              CHOICE {
        common                                       SEQUENCE {
            dci-Format0-0-AndFormat1-0                   SEQUENCE {
                ...
            }
OPTIONAL, -- Need R
            dci-Format2-0                                SEQUENCE {
                nrofCandidates-SFI                           SEQUENCE {
                    aggregationLevel1                            ENUMERATED {n1, n2}
OPTIONAL, -- Need R
                    aggregationLevel2                            ENUMERATED {n1, n2}
OPTIONAL, -- Need R
                    aggregationLevel4                            ENUMERATED {n1, n2}
OPTIONAL, -- Need R
                    aggregationLevel8                            ENUMERATED {n1, n2}
OPTIONAL, -- Need R
                    aggregationLevel16                           ENUMERATED {n1, n2}
OPTIONAL -- Need R
                },
                ...
            }
```

TABLE 5-continued

```
OPTIONAL, -- Need R
    dci-Format2-1                             SEQUENCE {
        ...
    }
OPTIONAL, -- Need R
    dci-Format2-2                             SEQUENCE {
        ...
    }
OPTIONAL, -- Need R
    dci-Format2-3                             SEQUENCE {
        dummy1                     ENUMERATED {sl1, sl2, sl4, sl5, sl8, sl10,
sl16, sl20}  OPTIONAL, -- Cond Setup
        dummy2                     ENUMERATED {n1, n2},
        ...
    }                                              OPTIONAL
-- Need R
    },
    ue-Specific                               SEQUENCE {
        dci-Formats            ENUMERATED {formats0-0-And-1-0,
formats0-1-And-1-1},
        ...
    }
  }
}                                              OPTIONAL -- Cond Setup
-- TAG-SEARCHSPACE-STOP
-- ASN1STOP
```

In the above table, 'controlResourceSetId' indicates the CORESET applicable for this search space. Value 0 identifies the common CORESET #0 configured in MIB. Each search space may be related (associated) with one 'ControlResourceSet'. 'duration' indicates the number of consecutive slots that a search space lasts in every occasion. 'monitoringSlotPeriodicityAndOffset' indicates slots for PDCCH monitoring configured as periodicity and offset. 'monitoringSymbolsWithinSlot' indicates the first symbol(s) for PDCCH monitoring in the slots configured for PDCCH monitoring.

'nrofCandidates' indicates the number of PDCCH candidates per aggregation level (AL). If configured in the search space of a cross-carrier scheduled cell, this field determines the number of candidates and aggregation levels to be used on the linked scheduling cell. For a scheduled cell in the case of cross-carrier scheduling, except for 'nrofCandidates', all the optional fields are absent. In this case, the search space set configuration for the scheduled cell may follow the linked search space set configuration for the scheduling cell (e.g., the configuration of a search space set with the same ID), except the number of candidates and the aggregation levels.

In an NR control channel, the maximum number of blind decoding attempts and the maximum number of channel estimation attempts the UE may make for a specific time unit may be defined (channel estimations may be counted based on the number of CCEs). This may be construed as limiting the number of times of BD and CE the UE may perform in one slot. The UE may know the number of BDs and the number of CEs they have to monitor in a specific slot according to a plurality of search space set configurations indicated by the network, and, if the number of configured BD and the number of configured CEs exceed the above-mentioned BD/CE limits, a set for monitoring may be selected from among the configured search space sets according to prescribed rules (e.g., the network has to ensure that the BD/CE limits are not exceeded for CSS, CSS has a higher priority than USS, and a search space set with a lower index, among USS sets, has a higher priority) and perform monitoring.

Meanwhile, in the following two cases, the BD/CCE limits per slot per CC may be the same as the BD/CCE limits in non-CA (carrier aggregation), regardless of whether one or more numerologies are used or not. 1) self-scheduling in up to four DL-CCs, 2) self-scheduling up to T DL-CCs, the BD capability y reported by the UE is T or more. Here, y is an integer between 4 and 16, and T is an integer between 1 and 16.

In the case where a scheduling CC and a scheduled CC have the same numerology, if there are up to four DL-CCs, or if cross-carrier scheduling is performed for up to T DL-CCs when the BD capability y reported by the UE is T or greater, the BD/CCE limits per slot for the scheduling CC may be given by (number of CCs that can be scheduled by a scheduling CC)×(BD/CCE limits for non-CA).

In the case of self-scheduling with the same numerology or different numerologies, if there are up to four DL-CCs (≤4), or if there are up to T DL-CCs when the BD capability y reported by the UE is greater than T (y≥T), the network may ensure that the number of BDs and the number of CCEs do not exceed the non-CA limits in any secondary cell.

In the case of self-scheduling with the same numerology, if there are more than four DL-CCs and there are up to T DL-CCs when the BD capability y reported by the UE is less than T, the BD and CCE limits per CC per slot may be determined based on the BD capability of the UE. The number of BDs and number of CCEs for each CC may be determined according to the non-CA limits on each CC.

In the case of self-scheduling, the BD capability y reported by the UE may be an integer between 4 and 16. A UE that does not support carrier aggregation of CCs using different numerologies may apply the reported y value to every numerology.

For a UE supporting carrier aggregation of CCs using different numerologies, the reported y value is applied when carrier aggregation of CCs using the same numerology is configured. If carrier aggregation using different numerologies is configured, the y value is applied to each set of DL-CCs using the same numerology.

For example, let's assume that X0, X1, X2, or X3 DL-CCs are configured for a UE. Here, Xi represents the number of DL-CCs having numerology i. In this case, the BD and CCE limits (per slot) of the DL-CCs having numerology I may be given by Floor{Xi/(X0+X1+X2+X3)*(Mi or Ni)*y}. Here, Mi may be the number of BDs per slot defined no non-CA, and Ni may be the number of CCEs per slot defined for non-CA. The value of Xi may be zero depending on the CA configuration.

In the case of self-scheduling with different numerologies, if there are more than four DL-CCs and there are up to T DL-CCs when the BD capability y reported by the UE is less than T, the BD and CCE limits per CC per slot may be determined based on the BD capability of the UE.

For example, let's assume that X0, X1, X2, or X3 DL-CCs are configured for a UE. Here, Xi represents the number of DL-CCs having numerology i. In this case, the BD and CCE limits (per slot) of the DL-CCs having numerology I may be given by Floor{Xi/(X0+X1+X2+X3)*(Mi or Ni)*y}. Here, Mi may be the number of BDs per slot defined no non-CA, and Ni may be the number of CCEs per slot defined for non-CA. The value of Xi may be zero depending on the CA configuration.

In the above description, the non-CA limits may refer to the BD and CCE limits per slot when CA is not applied, and may have the following values for each numerology. The BD limit for {15, 30, 60, 120 kHz} may be {44, 36, 22, 20}, respectively. The CE limit for {15, 30, 60, 120 kHz} may be {56, 56, 48, 32 CCEs}, respectively.

Considering what has been discussed and what will be proposed below, the UE may report its capability for simultaneous BDCCH/PDSCH transmission and reception in the form of UE capability (=the number of carriers)—for example, in the above formula, y may represent UE capability. y reported by the UE may be converted into the number of carriers configured by the network and the actual BD and CE limits in each carrier given by the above formula, thereby controlling the PDCCH monitoring of the UE.

<Overbooking for CA Case>

PDCCH overbooking (hereinafter, simply referred to as overbooking) means that the number of BDs and number of CCEs configured in a specific slot exceed the limits. If overbooking is not permitted, then the network shall limit the number of search space sets where monitoring is performed in each slot or adjust the ALs and number of candidates per AL in each search space set to avoid the worst case. Thus, it may be difficult to ensure scheduling flexibility.

For example, in a case where 10 search space sets are configured, the network shall adjust the number of candidates in each search space set under the assumption that 10 search space sets are monitored in one slot. Then, if monitoring of one search space set is performed in a particular slot, this means that the scheduling opportunity is too low for UE capability. On the other hand, the UE does not have to calculate the number of BDs and number of CCEs per slot and select candidates for monitoring when the limits are exceeded, thereby allowing for easier UE implementation.

For a secondary cell SCell, the network may ensure that the BD/CCE limits defined for the non-CA case are not exceeded. In contrast, for a primary cell PCell, which may be able to receive more information than the secondary cell, it is important to ensure scheduling flexibility for each information. Accordingly, the present disclosure proposes that overbooking is permitted for a primary cell in the CA case and also proposes that the BD/CCE limits for the primary cell are determined as follows.

Although the following description will be given based on self-scheduling, it is apparent that the following also applies to cross-carrier scheduling.

Moreover, the numerology of each CC in CA/non-CA operations may be assumed to be the numerology of a currently active BWP within the corresponding CC. This is to define the numerology of a specific CC in each slot because the BD/CCE limits are defined as different values for each numerology and there may exist a plurality of BWPs with different numerologies within each CC.

As another method, the numerology of an initial BWP of each CC or the numerology of a BWP with the highest (or lowest) index may be assumed to be the numerology of the corresponding CC in a specific slot. Alternatively, the numerology with the largest subcarrier spacing, among the numerologies within BWPs configured for the corresponding carrier, may be assumed to be the numerology of the corresponding CC.

Additionally, the following embodiment will be given to describe the disclosure below. The network may assume that five component carriers are configured for CA operation and the numerology of each CC is configured as follows. The reported UE capability (y) is 4, the subcarrier spacing of the primary cell is 15 kHz, the subcarrier spacing of Secondary Cell #0 is 15 kHz, the subcarrier spacing of Secondary Cell #1 is 15 kHz, the subcarrier spacing of Secondary Cell #2 is 30 kHz, and the subcarrier spacing of Secondary Cell #3 is 60 kHz <BD/CCE Limits for Primary Cell>

Option 1) Non-CA limits

In CA operation, a primary cell may determine whether to monitor candidates based on non-CA limits. In this case, the above formula for determining the BD/CCE limits for each numerology may be changed as follows. It can be assumed that the above formula applies only to a secondary cell, and (y−1) in the formula to be described below may represent UE capability except for the primary cell.

If a UE is configured with DL-CCs (other than the primary cell) of X0, X1, X2, or X3, where Xi denotes the number of DL-CCs (other than the primary cell) with the numerology i, the BD or CCE limits for the DL-CCs (other than the primary cell) with the numerology i may be given by Floor{Xi/(X0+X1+X2+X3)*(Mi or Ni)*(y−1)} per slot. Floor X is a function that returns the highest integer less than or equal to x, wherein Mi and Ni represent the number of BDs and number of CCEs per slot specified for non-CA, respectively. Some of the values of Xi may be zero depending on the CA configuration.

In a case where the present disclosure is applied to the above example, the BD limit for the primary cell (15 kHz) may be set to 44, the BD limit for a secondary cell with a subcarrier spacing of 15 kHz (Secondary Cells #0 and #1) may be set to 66, the BD limit for a secondary cell with a subcarrier spacing of 30 kHz (Secondary Cell #2) may be set to 27, and the BD limit for a secondary cell with a subcarrier spacing of 60 kHz (Secondary Cell #3) may be set to 16. For instance, the BD limit for a secondary cell with a subcarrier spacing of 15 kHz may be derived by an equation floor{(2/(2+1+1))*44*3}=66.

For the primary cell, the limits for non-CA may be applied to the primary cell in order to allow more scheduling flexibility. In this case, the BD or CCE limit for a secondary cell with the numerology i may be given by Floor{(Xi/(X0+X1+X2+X3))*(Mi or Ni)*(y−1)} per slot. The primary cell may not be included in this formula. The BD/CCE limits for the primary cell may be given by min{configured number of BDs/configured number of CCEs, limits for non-CA}, where min {X,Y} represents the smaller one between X and Y.

As another method for applying non-CA limits to the primary cell, the BD/CCE limits for each numerology may be derived by the above formula, and the BD/CCE limits allocated for the numerology of the primary cell, except the BD/CCE limits for non-CA for the primary cell, may be shared by the secondary cells configured with the corresponding numerology. In this case, if the capability reported by the UE is smaller than the number of DL-CCs configured by the network, and the numerology to which the primary cell belongs is used by the primary cell alone, fewer BDs/CCEs than the BD/CE limits for non-CA may be allocated for the corresponding numerology.

In this case, that is, if the number of BDs and number of CCEs allocated for the numerology where the primary cell is included are less than the non-CA limits, it may be assumed that the BD/CCE limits for the primary cell are determined by the numbers of allocated BDs/CCE. For example, they may be determined as min{non-CA limits, limits from an specified formula}.

By contrast, the BD/CE opportunities for secondary cells with the same numerology as the primary cell may be decreased. Additionally, in order to ensure the maximum BD/CCE limits for secondary cells, if the BD/CCE limits for the primary cell derived by the above proposal are higher than the BDs/CCEs configured for the primary cell in the corresponding slot, the set numbers of BDs and CCEs may be considered to be the BD/CCE limits for the primary cell. This also applies to Option 2 to be proposed below, as well as Option 1.

The second method may be implemented as follows.

For the primary cell, the limits for non-CA may be applied to the primary cell in order to allow more scheduling flexibility. In this case, the total BDs/CEs for the primary cell and secondary cells having numerology i may be given by Floor{(Xi/(X0+X1+X2+X3))*(Mi or Ni)*y}. Also, the BD/CCE limits for the primary cell may be given by min{set number of BDs and set number of CCEs, limits for non-CA for numerology i}. If the above Option 1 is used, the total numbers of BDs and CEs that can be allocated to the secondary cell(s) having numerology i may be given by Floor{(Xi/(X0+X1+X2+X3))*(Mi or Ni)*(y)}−min{configured numbers of BDs and CCEs for the primary cell, limits for non-CA for numerology i}.

Option 2) Limits based on formula

Option 2 is a method of using a derived value by including the primary cell in the above formula. The UE may derive the BD/CCE limits for the numerology of the primary cell by the above formula, and consider that values obtained by dividing the derived value by the number of DL-CCs using the corresponding numerology are the BD/CCE limits for the primary cell. That is, the BD/CCE limits of numerology i (derived from the formula) (the number of DL-CCs using numerology i) may be deemed as the BD/CCE limits for the primary cell, and if these values are not integers, a floor or ceiling function may be applied. That is, Option 2 may work as follows.

In this option, it can be assumed that the limits for the primary cell are determined by "$limit_{PCell}/X_{PCell}$" assuming that BD/CE budgets are evenly distributed across cells with the same numerology I, where $limit_{PCell}$ means the limit of the numerology including the primary cell, and $X_{PCell}$ means the number of DL-CCs with the numerology including the primary cell. Then, the limits for secondary cells having the numerology may be given by "$limit_{PCell}-limit_{PCell}/X_{PCell}$".

In order to achieve scheduling flexibility for the primary cell, Option 1 is preferable. In addition, the number of BDs and number of CEs configured for secondary cells having the numerology i may not be evenly distributed across the secondary cells. It's up to the network to ensure that the total does not exceed the maximum, and non-CA limits may be applied for each subcarrier. A certain number of BDs/CEs may be supported for a cell as long as the two conditions are both met.

In the case where Option 2 is used, the UE may perform measurement on different carrier aggregation combinations depending on the option when reporting the y value. For example, in the case where Option 1 is used, the UE may calculate y−1 and report they value, by assuming the numerology 15, 30, 60, and 120 kHz used for the primary cell and the maximum BD/CE for the corresponding primary cell and considering a case of aggregation of different subcarriers into a secondary cell (i.e., a combination of different numerologies) under the corresponding primary cell's numerology circumstance.

<BD/CCE Limits for Cross-Carrier Scheduling>

In the above, a method for configuring BD/CE limits for self-scheduling in carrier aggregation and a method for configuring BD/CE limits for cross-carrier scheduling with the same numerology have been described. Hereinafter, a method for configuring BD/CE limits for cross-carrier scheduling between DL-CCs with different numerologies will be proposed.

Cross-carrier scheduling means that a scheduling CC performs scheduling on a scheduled CC. The UE receives a PDCCH for the scheduled CC in the scheduling CC, and the corresponding PDCCH refers to an operation of scheduling the PDSCH of the scheduled CC. In the case of NR, different numerologies may be configured for each CC. Also, different numerologies mean different slot lengths (e.g., 1 ms for 15 kHz, 0.5 ms for 30 kHz, . . . ). Thus, if the BD/CE limits for cross-carrier scheduling are derived by applying the BD/CE limits defined as the BD/CE counts per slot to different numerologies, this will cause too much complexity.

Accordingly, the present disclosure proposes to assume that, when deriving the BD/CE limits for the scheduling cell in cross-carrier scheduling, the numerology for the scheduled cell is the same as the numerology for the scheduling cell. This also may be construed that the Bd/CE limits are defined based on an actual scheduling CC.

The BD/CE limits for each numerology may be given by the aforementioned formula (i.e., Floor{Xi/(X0+X1+X2+X3)*(Mi or Ni)*y}), and this formula may be applied by substituting the numerology for the scheduling CC for the numerology for the scheduled CC.

This will be described as follows.

For cross-carrier scheduling, DCIs for scheduled cells are transmitted and received in a scheduling cell. Thus, it is desirable that the BD/CCE limits for the scheduled cells are derived based on the numerology of the scheduling cell.

For example, if cross-carrier scheduling is applied to 3 CCs, and the numerologies for each cell include 15 kHz for a scheduling cell, 30 kHz for scheduled cell #1, and 60 kHz for scheduled cell #2, then the UE may assume that there are three cells with 15 kHz in determining the BD/CCE limits.

Then, the limits (per slot) for each numerology i may be given by Floor{Xi/(X0+X1+X2+X3)*(Mi or Ni)*y}. In other words, in the case of cross-carrier scheduling, the numerology configured for a scheduling carrier is used instead of the numerology configured for a scheduled carrier.

Moreover, whether cross-carrier scheduling is supported or not may be signaled for each band combination. Accordingly, when a number of carriers are configured, cross-carrier scheduling may be supported or not depending on UE capability. Ina case where cross-carrier scheduling is supported for a particular band combination, it may be assumed that the y value reported for the particular band combination may be applied to both self-scheduling and cross-carrier scheduling.

To calculate the y value supported for a carrier (cross-carrier) to which cross-carrier scheduling is applied and a carrier (self-carrier) to which self-scheduling is applied, one of the following methods may be applied.

Option 1: The same y value may be applied to cross-carriers and self-carriers. This may mean that, within a bandwidth combination supported by the UE, X1, X2, X3, and X4 for the self-carriers and cross-carriers may be determined according to the numerology available for each of M sets of carriers that can be aggregated within the corresponding band combination, within a bandwidth combination supported by the UE, and then the maximum y value satisfying the UE's own BD/CE capability may be calculated by putting the corresponding value into the formula. In the case of a cross-carrier, they value is determined assuming that there is a valid band combination the UE has reported for which the UE supports a cross-carrier, and otherwise, the y value may be determined assuming that there is no valid band configured for the corresponding carrier aggregation combination.

Option 2: Different y values are reported for cross-carriers and self-carriers. Since the y value may differ for self-scheduling and cross-carrier scheduling, different y values may be reported. It can be assumed that the y value for self-subcarriers may be applied when scheduling works only with self-carriers, and the y value for cross-carriers may be applied when there is at least one cross-carrier. This is to deal with a case where they value for cross-carrier scheduling is smaller compared to self-scheduling.

Option 3: The y value may work only with self-carriers. The corresponding y value may be applied to cross-carriers. In cross-carrier scheduling, it may be assumed that a scheduling carrier with a larger subcarrier spacing may support scheduling of a scheduled carrier with a smaller subcarrier spacing (or both of them have the same subcarrier spacing) (or vice versa. i.e., a scheduling carrier with a smaller subcarrier spacing may support scheduling of a scheduled carrier with a larger subcarrier spacing. That is, it is assumed that complexity increases depending on the numerology in terms of BD/CE capability, and that cross-carrier scheduling with decreasing complexity may be performed without additional consideration. Alternatively, it may be assumed that, if X1: 15 kHz, X2: 30 kHz, X3: 60 kHz, and X4: 120 kHz carriers are configured for cross-carrier sets X1, X2, X3, and X4, respectively, within a band combination the UE supports with self-carriers, the corresponding cross-carrier set satisfies y. In this case, it may be assumed that a combination of cross-carrier scheduling and carrier aggregation possesses as much BD/CE capability as y, without any consideration.

<Search Space Set Configuration for Secondary Cell for Cross-Carrier Scheduling>

In an NR system, a BWP configuration may be indicated for each cell, and a CORESET/search space (SS) set configuration may be included in the corresponding BWP to perform monitoring in the BWP. The CORESET and search space set configurations may be independently indicated, and this means that, in the case of self-scheduling, the monitoring occasions, the target DCI format, the aggregation levels (ALs), and the number of candidates per aggregation level are defined differently for each cell.

Such independent configurations may cause ambiguity about how a scheduling cell will perform CORESET configuration/search space set configuration on a scheduled cell (i.e., a cell(s) scheduled by the scheduling cell) in cross-carrier scheduling. For example, a CORESET related with search space set #1 of the scheduled cell may be absent in the scheduling cell. Also, while the scheduled cell may require monitoring of a particular search space set in a slot, the scheduling cell may have no search space set for monitoring in that slot. The present disclosure proposes a method for solving this problem in cross-carrier scheduling. The methods proposed below may be implemented alone or in combinations, and this means that some of the proposals in a particular method may be applied to other methods.

Method 1) Follow CORESET/search space set configurations for scheduling cell

In a case where cross-carrier scheduling is configured for a particular cell, and the particular cell is a scheduled cell, the UE may assume that scheduling of the particular cell is performed based on the CORESET/search space set configurations of the scheduled cell, in a duration where cross-carrier scheduling is applied. That is, candidates may be selected by applying a carrier indicator (Nci) value allocated for the scheduled cell to the CORESET/search space set configurations for the scheduled cell, and the target DCI, search space type, AL, and number of candidates per AL in each search space set may be monitored as configured for the scheduled cell. This is advantageous in that no additional signaling is required, but there may be a problem if the BD/CCE limits are different for the scheduling cell and the scheduled cell. For example, if the BD limit for the scheduling cell is lower than the BD limit for the scheduled cell, the BD of the scheduled cell may be wasted due to a candidate drop or the like in the scheduling cell. On the contrary, if the BD limit for the scheduling cell is higher than the BD limit for the scheduled cell, the scheduled cell may have to perform more BDs beyond their BD capability.

Method 2) Indication of candidate ratio of scheduled cell relative to scheduling cell To solve the problem of Method 1, when indicating cross-carrier scheduling for a scheduled cell, the network may indicate information about the number of candidates for the scheduled cell relative to the number of candidates for the scheduling cell (or the ALs and number of candidates by which the scheduled cell will be monitored).

That is, a single piece of information may be indicated and applied to all scheduled cells related with a single scheduling cell, or different pieces of information may be indicated for each scheduled cell. In the former case, signaling overhead may be reduced, and, in the latter case, the number of candidates may be adjusted for each scheduled cell, thus increasing flexibility. For example, one value among 50%, 70%, 100%, and 200% may be specified, and the UE may know the number of candidates for the scheduling cell by applying the indicated ratio to the number of candidates per AL of the scheduling cell, and, if the corresponding value is not an integer, a floor or ceiling function/operation may be indicated. If the UE is instructed to monitor more candidates than configured for the scheduling cell, the UE may apply a hashing function in the scheduling cell, based on the largest number of candidates the scheduling cell and the scheduled cell(s) may have.

In order to avoid additional RRC signaling, the number of candidates for the scheduled cell may be fixed. For example, a specific number of candidates or a specific ratio may be specified for each AL in advance. For example, the number of candidates per AL for the scheduled cell may be specified to be 80% of the number of candidates for the corresponding AL of the scheduling cell (additionally, a floor or ceiling operation is possible).

Alternatively, the number of candidates for the scheduled cell may be determined in association with the BD/CCE limits in CA. In an example, a ratio of candidates for the scheduled cell may be determined by a ratio between the number of cells configured for the corresponding UE (or the number of actually active cells among the configured cells) and the UE capability (i.e., the number of carriers that can be supported) reported by the UE. For example, if there are 10 active cells and the capability reported by the UE is 5, the number of candidates for the scheduled cell relative to the scheduling cell may be determined by applying the ratio of 5/10 (=50%) (Additionally, the number of cells using the numerology of each scheduled cell may be taken into consideration).

Furthermore, the present disclosure proposes that the number of candidates per AL of the scheduled cell in cross-carrier scheduling does not exceed the number of candidates per AL of the scheduling cell. By doing so, there is no need to give further consideration to the BD/CCE limits or the like, and the complexity of UE implementation may be reduced because the parameters of the hashing may be simplified.

Method 3) Search space set configuration for cross-carrier scheduling

A search space set configuration for cross-carrier scheduling may be indicated by the network, separately from self-scheduling. It may be included in a search space set configuration or cross-carrier scheduling configuration (e.g., 'CrossCarrierSchedulingConfig'). All or some of what is proposed below may be included.

1. Linkage between search space set configurations.
    A. A search space set configuration for a scheduling cell related with a specific search space set configuration for a scheduled cell may be indicated.
    B. If this information is not included, it may be assumed that a search space set of the scheduled cell for cross-carrier scheduling is related with a search space set of the scheduling cell with the same search space set index as the scheduled cell. If there is no search space set of the scheduling cell with the same search space set index as the scheduled cell in a particular slot, it may be assumed that the scheduled cell is not monitored in that slot.
2. Monitored DCI format (or RNTI (radio network temporary identifier) type)
    A. A DCI format or RNTI type to be monitored may be included in a search space set configuration for a scheduled cell.
    B. This may mean that, for a particular search space set of the scheduled cell, the scheduling cell and the scheduled cell may have different monitoring targets. In an example, in a search space set #X of the scheduling cell, monitoring of the scheduling cell may be performed based on SI-RNTI, and monitoring of the scheduled cell may be performed based on C-RNTI.
3. Monitoring occasion information
    A. A scheduling cell and a scheduled cell may be configured with different monitoring occasions to obtain effects such as power saving.
    B. In an example, the network may indicate a search space set configuration for the scheduled cell in such a way that scheduled cell monitoring occasions are within scheduling cell monitoring occasions. For example, the monitoring occasion rate may be set to 50% so that monitoring is performed with half the monitoring occasions for the linked scheduling cell.
    C. The monitoring occasions for the scheduled cell may be predefined to be adjusted only within the monitoring occasions for the search space set of the linked scheduling cell, in order to reduce signaling complexity.
4. Aggregation levels (ALs) and number of candidates per AL
    A. The ALs and the number of candidates per AL to be applied when monitoring scheduling of a scheduled cell may be indicated. This applies in the same way as Method 2.
5. Monitoring duration
    A. In a search space set configuration, the number of slots in which monitoring is continuously performed may be indicated through a parameter "duration", which may be applied for beam sweeping.
    B. Whether an operation such as beam sweeping is required or not may be applied differently for different cells. Thus, a search space set configuration for a scheduled cell may be indicated in such a way that monitoring is performed over the entire or a part of a defined duration. For example, for the same search space set, the scheduling cell may be monitored in a duration of three consecutive slots, and the scheduled cell may be monitored only in the first slot of the duration.

Method 4) Information of related CORESET in scheduling cell

A scheduling cell's CORESET information related with a corresponding search space set for a scheduled cell may be indicated. That is, the search space set configuration follows the configuration for the scheduled cell, whereas the CORESET related with the corresponding search space set may be allocated to the scheduling cell.

This indication may mean that the CORESET and search space set configuration for the scheduled cell exist independently in the scheduling cell. That is, the search space set configuration for the scheduled cell creates a monitoring opportunity in association with the CORESET of the scheduling cell.

This information may be included in the search space set configuration for the scheduled cell for self-scheduling. That is, the search space set configuration for the scheduled cell may include CORESET information of the corresponding cell to be related when self-scheduling is applied and CORESET information of the scheduling cell to be related when cross-carrier scheduling is applied, and the actually related CORESET may be determined by the cross-carrier scheduling configuration.

<Search Space Set Configuration for Scheduled Cell for Cross-Carrier Scheduling (Added)>

Method 5) Search space set reconfiguration

As another method for configuring a search space set for a scheduled cell in cross-carrier scheduling, search space set reconfiguration may be considered.

When configuring cross-carrier scheduling, the network may inform the UE whether to apply cross-carrier scheduling or not, through 'CrossCarrierSchedulingConfig' IE in the 'ServingCellConfig' information element IE. 'CrossCarrierSchedulingConfig' may include a parameter informing whether the corresponding cell is a scheduling cell or a scheduled cell and a parameter indicating a carrier index. Additionally, 'ServingCellConfig' may include configurations for BWPs within the corresponding cell, and each BWP configuration may include CORESET and search space set configurations allocated to the corresponding BWP. Accordingly, the network may reconfigure the search space set included in each BWP within the corresponding cell, when configuring cross-carrier scheduling. However, if cross-carrier scheduling is configured and a particular cell is configured as a scheduled cell, a search space set reconfiguration for the corresponding cell may be construed as follows (that is, the following construal may be applied only when cross-carrier scheduling is 'enabled' and the corresponding cell is a scheduled cell).

Only some of the contents included in a general search space set configuration (e.g., the above-mentioned 'SearchSpace'IE) may be construed as a valid configuration for the scheduled cell in cross-carrier scheduling, and the other contents may be ignored regardless of the configured values. This may mean that the ignored contents are replaced with a search space set configuration for the scheduling cell. Based on what follows, the search space set configuration for the scheduled cell may be construed as indicating a method for the scheduling cell to monitor the scheduling of the scheduled cell.

1. Search space set index
  A. A search space set index for a scheduled cell may be construed as being mapped one to one to a search space set index for a scheduling cell. That is a search space set ID #X for a scheduled cell may correspond to a search space set ID #X for a scheduling cell, and some of the contents in the corresponding search space set configuration may be applied to the search space set ID #X of the scheduling cell to indicate candidates for monitoring the DCI for the scheduled cell.
  B. In a case where the search space set indices for the scheduling cell and schedule cell are not mapped one to one, the network may inform with which search space set for the scheduling cell each search space set for the scheduled cell is related. This may mean, if there is no search space set for the scheduling cell with the same index as the search space set for the scheduled cell in a particular slot, it can be assumed that the scheduled cell is not monitored in that slot.
2. CORESET ID
  A. In a general search space set configuration, a CORESET ID related with a corresponding search space set may be indicated. However, a CORESET ID in a search space set configuration reconfigured for a scheduled cell may not be signaled, or ignored even if it is signaled.
  B. Actual scheduling for the corresponding scheduled cell may be performed in a search space set of a scheduling cell related with the corresponding search space set. It is desirable that the CORESET follows the CORESET configuration related (associated) with the search space set of the scheduling cell.
3. Aggregation levels (ALs) and number of candidates per aggregation level (AL)
  A. The network may indicate the aggregation levels and the number of candidates per aggregation level that need to be applied when monitoring the DCI for a corresponding scheduled cell in a CORESET/search space set of a scheduling cell based on the AL and candidate information within the search space set configuration for the scheduled cell.
  B. When performing monitoring in a particular search space set for a scheduling cell, the UE may know CCE(s) constituting each candidate in the scheduling cell by applying a hashing function for the scheduling cell based on the largest number of candidates the cells (both the scheduling and scheduled cells) related with the corresponding search space set for each AL may have. Each scheduled cell may know CCE(s) constituting candidates by using the carrier index $n_{CI}$ of each scheduled cell.
4. Monitoring occasion-related information
  A. Monitoring occasion information in a general search space set configuration may be defined as monitoring periodicity, slot offset, pattern in a slot, a duration, etc. It may be assumed that monitoring occasions for a scheduled cell in cross-carrier scheduling work based on monitoring occasions for a scheduling cell. That is, monitoring occasion-related information in a search space set configuration for a scheduled cell in cross-carrier scheduling may be not be signaled or may be ignored.
  B. Additionally, monitoring occasions for a scheduled cell may be restricted as a subset of monitoring occasions for a scheduling cell. This may be used as a method for increasing scheduling flexibility for each cell in cross-carrier scheduling. As mentioned previously, the monitoring occasions for the scheduled cell may be reduced by introducing an offset, periodicity, etc. in the monitoring occasions for the scheduling cell.
5. Search space type-related information
  A. In a general search space set configuration, a corresponding search space set may be designated as one for USS or one for CSS. For USS, either fallback DCI or non-fallback DCI may be monitored. Also, a DCI format for monitoring may be indicated.
  B. In cross-carrier scheduling, it may be desirable to follow search space type-related information (including a target DCI) configured for a search space set for an related scheduling cell, in order to easily perform operations. Additionally, it may be assumed that monitoring of a specific DCI format (e.g., fallback DCI, paging, TPC, etc) is not performed for a scheduled cell in cross-carrier scheduling. In this case, for the corresponding DCI format (or RNTI type), only the scheduling cell may be monitored, and monitoring of the scheduled cell may be omitted.
  C. Otherwise, search space type-related information is signaled for a scheduled cell in cross-carrier scheduling, the UE may perform monitoring (of different ALs and the number of candidates) for DCIs of other types than the target DCI of the scheduling cell in a search space set for the related scheduling cell.

Figure 15:
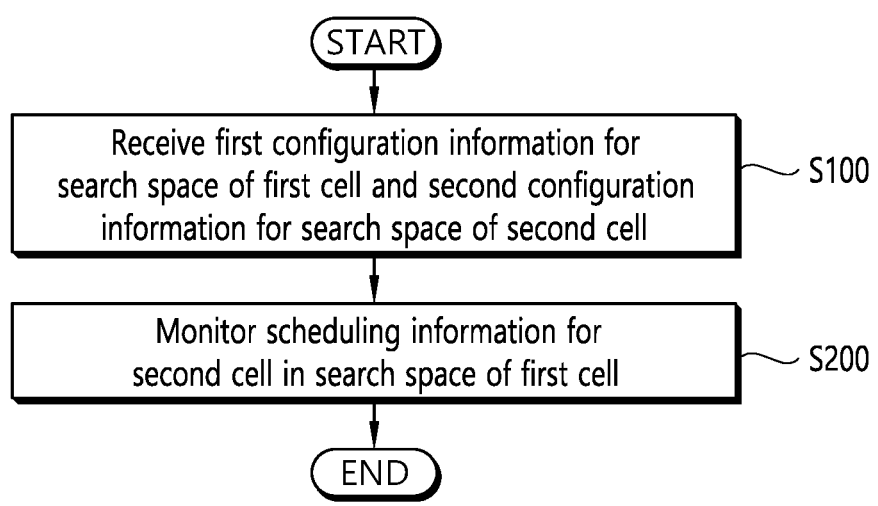
FIG. 15 illustrates a method for monitoring scheduling information by a UE according to the above-described Method 5.

FIG. 15 illustrates a method for monitoring scheduling information by a UE according to the above-described Method 5.

Referring to FIG. 15, a UE receives first configuration information for a search space of a first cell and second configuration information for a search space of a second cell (S100). For example, the first configuration information and the second configuration information may be received through an RRC (radio resource control) signal. The first cell and the second cell may be cells having different subcarrier spacings or cells having the same subcarrier spacing.

The UE monitors scheduling information for the second cell in the search space of the first cell (S200). In this case, the number of physical downlink control channel (PDCCH) candidates to be applied for monitoring the scheduling information in the search space of the first cell may be determined based on the second configuration information. For example, the number of PDCCH candidates per aggregation level (AL) to be applied for monitoring in the search space of the first cell may be determined based on the second configuration information.

That is, the number of physical downlink control channel (PDCCH) candidates per aggregation level (AL) to be used in the search space of the first cell may be set based on the second configuration information.

As described above, search space configuration information may be provided for each cell. That is, first configuration information may be provided for the search space of the first cell, and second configuration information may be provided for the search space of the second cell. The first configuration information may be provided as shown in the following table. The table below re-describes the above Table 5 for the sake of convenience.

TABLE 6

```
- ASN1START
-- TAG-SEARCHSPACE-START
SearchSpace ::=                                 SEQUENCE {
    searchSpaceId                                   SearchSpaceId,
    controlResourceSetId                            ControlResourceSetId
OPTIONAL, -- Cond SetupOnly
    monitoringSlotPeriodicityAndOffset              CHOICE {
        sl1                                             NULL,
        sl2                                             INTEGER (0..1),
        sl4                                             INTEGER (0..3),
        sl5                                             INTEGER (0..4),
        . . .
        sl1280                                          INTEGER (0..1279),
        sl2560                                          INTEGER (0..2559)
    }                                               OPTIONAL,
-- Cond Setup
    duration                                        INTEGER (2..2559) OPTIONAL,
-- Need R
    monitoringSymbolsWithinSlot                     BIT STRING (SIZE (14)) OPTIONAL,
-- Cond Setup
    nrofCandidates                                  SEQUENCE {
        aggregationLevel1                               ENUMERATED {n0, n1, n2, n3, n4, n5, n6, n8},
        aggregationLevel2                               ENUMERATED {n0, n1, n2, n3, n4, n5, n6, n8},
        aggregationLevel4                               ENUMERATED {n0, n1, n2, n3, n4, n5, n6, n8},
        aggregationLevel8                               ENUMERATED {n0, n1, n2, n3, n4, n5, n6, n8},
        aggregationLevel16                              ENUMERATED {n0, n1, n2, n3, n4, n5, n6, n8}
    }                                               OPTIONAL, --
Cond Setup
    searchSpaceType                                 CHOICE {
        common                                          SEQUENCE {
            dci-Format0-0-AndFormat1-0                      SEQUENCE {
            . . .
        }
OPTIONAL, -- Need R
        dci-Format2-0                                   SEQUENCE {
            nrofCandidates-SFI                              SEQUENCE {
                aggregationLevel1                               ENUMERATED {n1, n2}
OPTIONAL, -- Need R
                aggregationLevel2                               ENUMERATED {n1, n2}
OPTIONAL, -- Need R
                aggregationLevel4                               ENUMERATED {n1, n2}
OPTIONAL, -- Need R
                aggregationLevel8                               ENUMERATED {n1, n2}
OPTIONAL, -- Need R
                aggregationLevel16                              ENUMERATED {n1, n2}
OPTIONAL -- Need R
        },
        . . .
        }
OPTIONAL, -- Need R
        dci-Format2-1                                   SEQUENCE {
            . . .
        }
OPTIONAL, -- Need R
        dci-Format2-2                                   SEQUENCE {
            . . .
        }
```

TABLE 6-continued

```
OPTIONAL, -- Need R
    dci-Format2-3
        dummy 1                              SEQUENCE {
                                      ENUMERATED {sl1, sl2, sl4, sl5, sl8, sl10,
sl16, sl20}    OPTIONAL, -- Cond Setup
        dummy 2                       ENUMERATED {n1, n2},
        . . .
    }                                                OPTIONAL
-- Need R
    },
    ue-Specific
        dci-Formats                             SEQUENCE {
                                      ENUMERATED {formats0-0-And-1-0,
formats0-1-And-1-1},
        . . .
    }
    }                                         OPTIONAL -- Cond Setup
}
-- TAG-SEARCHSPACE-STOP
-- ASN1STOP
```

In the above table, a number of parameters 'controlResourceSetId', 'nrofCandidates', 'dci-Format( )-( )-AndFormat1-( )', etc. are marked 'OPTIONAL', which indicates that these parameters are not necessarily included in the configuration information but may be optionally included.

Meanwhile, the parameters marked as OPTIONAL in Table 5 or 6 other than nrofCandidates' may be absent in the second configuration information for the search space of the second cell. That is, the optional parameters other than nrofCandidates' (information indicating the number of PDCCH candidates per aggregation level, that is, information indicating the number of PDCCH candidates for a particular aggregation level, which may indicate the number of PDCCH candidates for every aggregation level or the number of PDCCH candidates for a particular aggregation level) may be absent in configuration information for a search space for a scheduled cell such as the second cell in cross-carrier scheduling.

When monitoring the scheduling information for the second cell in the search space of the first cell, at least one of the information (optional information/parameters) other than the number of PDCCH candidates ('nrofCandidates') may be set based on the first configuration information.

The information other than the number of PDCCH candidates ('nrofCandidates') may include, for example, information 'controlResourceSetId' indicating the ID (identity) of a control resource set (CORESET) related with the search space.

On the contrary, when monitoring scheduling information for the first cell in the search space of the first cell, the monitoring in the search space of the first cell may be performed based on the first configuration information.

Figure 16:
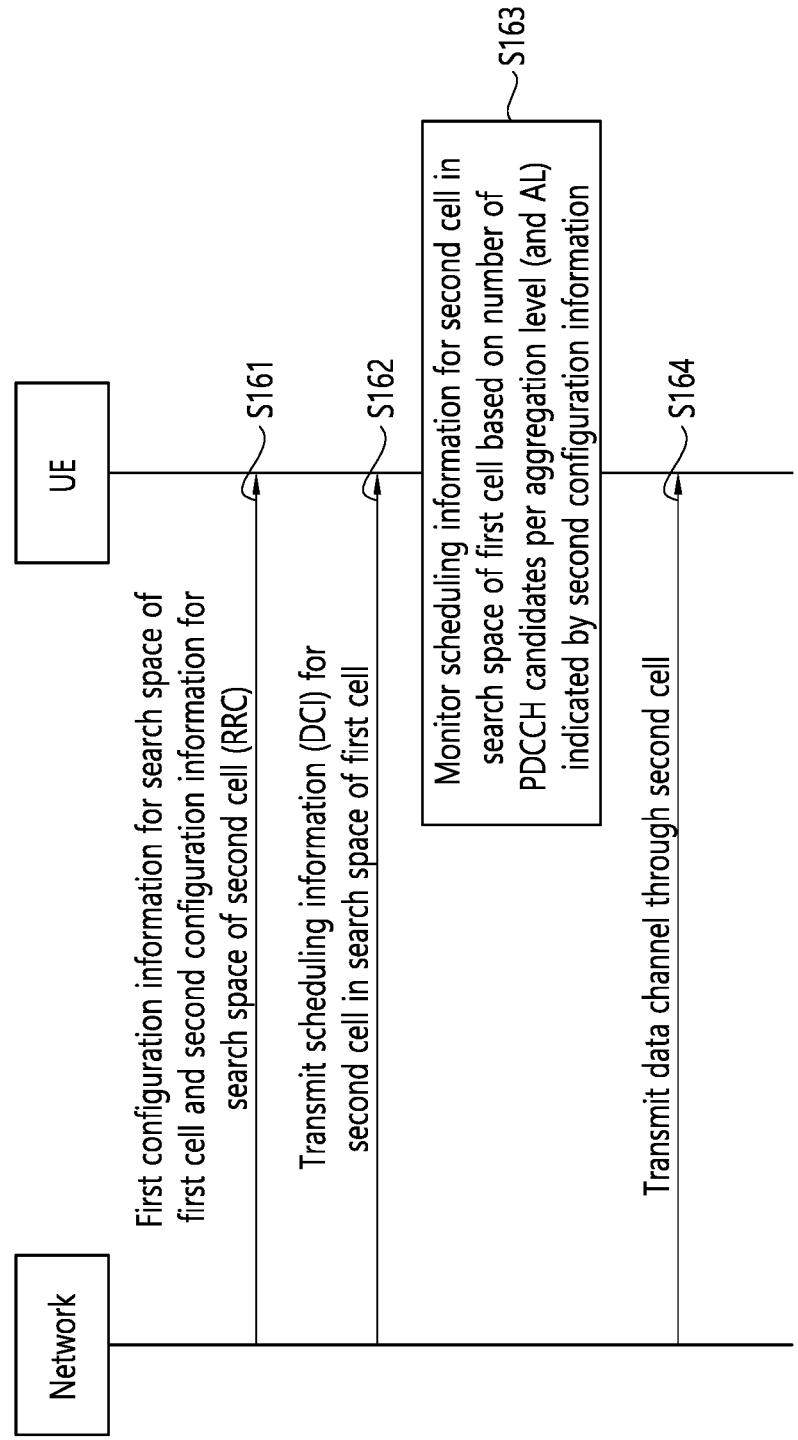
FIG. 16 shows an example of an operation between a UE and a network according to the method of FIG. 15.

FIG. 16 shows an example of an operation between a UE and a network according to the method of FIG. 15.

Referring to FIG. 16, the network may transmit first configuration information for a search space of a first cell and second configuration information for a search space of a second cell to a UE through an RRC signal (S161). The network may transmit the first configuration information and the second configuration information through one-time RRC signaling or through different RRC signals. For example, the first configuration information may be transmitted through a first RRC signal, and the second configuration information may be transmitted through a second RRC signal.

The UE may monitor scheduling information (e.g., DCI) for the second cell in the search space of the first cell (S162). The scheduling information for the second cell may be monitored in the search space of the first cell, based on the number of PDCCH candidates per aggregation level (and aggregation levels (ALs)) indicated by the second configuration information (S163). At least one of the parameters other than the number of PDCCH candidates may follow the first configuration information.

The network transmits a data channel through the second cell (S164). The data channel may be a PDSCH allocated (scheduled) by the scheduling information for the second cell.

Figure 17:
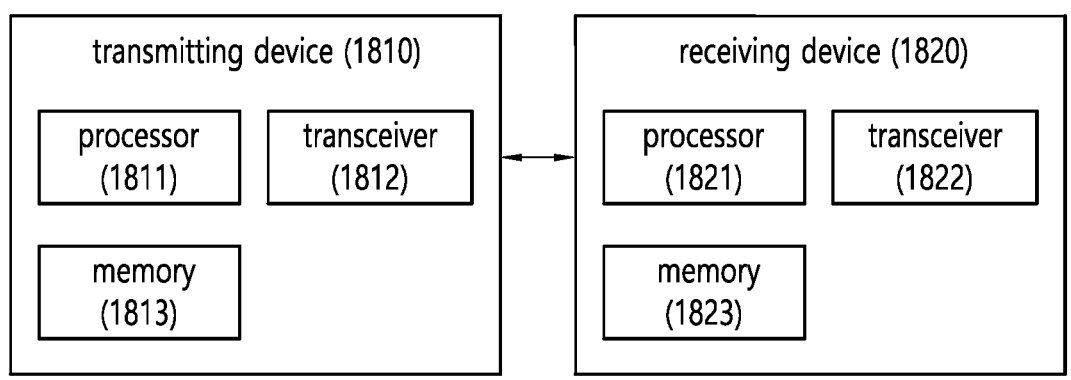
FIG. 17 is a block diagram showing components of a transmitting device and a receiving device for implementing the present disclosure.

FIG. 17 is a block diagram showing components of a transmitting device 1810 and a receiving device 1820 for implementing the present disclosure. Here, the transmitting device and the receiving device may be a base station and a terminal.

The transmitting device 1810 and the receiving device 1820 may respectively include transceivers 1812 and 1822 capable of transmitting or receiving radio frequency (RF) signals carrying information, data, signals and messages, memories 1813 and 1823 for storing various types of information regarding communication in a wireless communication system, and processors 1811 and 1821 connected to components such as the transceivers 1812 and 1822 and the memories 1813 and 1823 and configured to control the memories 1813 and 1823 and/or the transceivers 1812 and 1822 such that the corresponding devices perform at least one of embodiments of the present disclosure.

The memories 1813 and 1823 can store programs for processing and control of the processors 1811 and 1821 and temporarily store input/output information. The memories 1813 and 1823 may be used as buffers.

The processors 1811 and 1821 generally control overall operations of various modules in the transmitting device and the receiving device. Particularly, the processors 1811 and 1821 can execute various control functions for implementing the present disclosure. The processors 1811 and 1821 may be referred to as controllers, microcontrollers, microprocessors, microcomputers, etc. The processors 1811 and 1821 can be realized by hardware, firmware, software or a combination thereof. When the present disclosure is realized using hardware, the processors 1811 and 1821 may include ASICs (application specific integrated circuits), DSPs (digital signal processors), DSPDs (digital signal processing devices), PLDs (programmable logic devices), FPGAs (field programmable gate arrays) or the like configured to implement the present disclosure. When the present disclosure is realized using firmware or software, the firmware or software may be configured to include modules, procedures or functions for performing functions or operations of the present disclosure, and the firmware or software configured to implement the present disclosure may be included in the processors 1811 and or stored in the memories 1813 and 1823 and executed by the processors 1811 and 1821.

The processor 1811 of the transmitting device 1810 can perform predetermined coding and modulation on a signal and/or data to be transmitted to the outside and then transmit the signal and/or data to the transceiver 1812. For example, the processor 1811 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 1812 may include an oscillator for frequency up-conversion. The transceiver 1812 may include one or multiple transmission antennas.

The signal processing procedure of the receiving device 1820 may be reverse to the signal processing procedure of the transmitting device 1810. The transceiver 1822 of the receiving device 1820 can receive RF signals transmitted from the transmitting device 1810 under the control of the processor 1821. The transceiver 1822 may include one or multiple reception antennas. The transceiver 1822 can frequency-down-convert signals received through the reception antennas to restore baseband signals. The transceiver 1822 may include an oscillator for frequency down conversion. The processor 1821 can perform decoding and demodulation on RF signals received through the reception antennas to restore data that is intended to be transmitted by the transmitting device 1810.

The transceivers 1812 and 1822 may include one or multiple antennas. The antennas can transmit signals processed by the transceivers 1812 and 1822 to the outside or receive RF signals from the outside and deliver the RF signal to the transceivers 1812 and 1822 under the control of the processors 1811 and 1821 according to an embodiment of the present disclosure. The antennas may be referred to as antenna ports. Each antenna may correspond to one physical antenna or may be configured by a combination of a plurality of physical antenna elements. A signal transmitted from each antenna cannot be decomposed by the receiving device 1820. A reference signal (RS) transmitted corresponding to an antenna defines an antenna from the viewpoint of the receiving device 1820 and can allow the receiving device 1820 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 18:
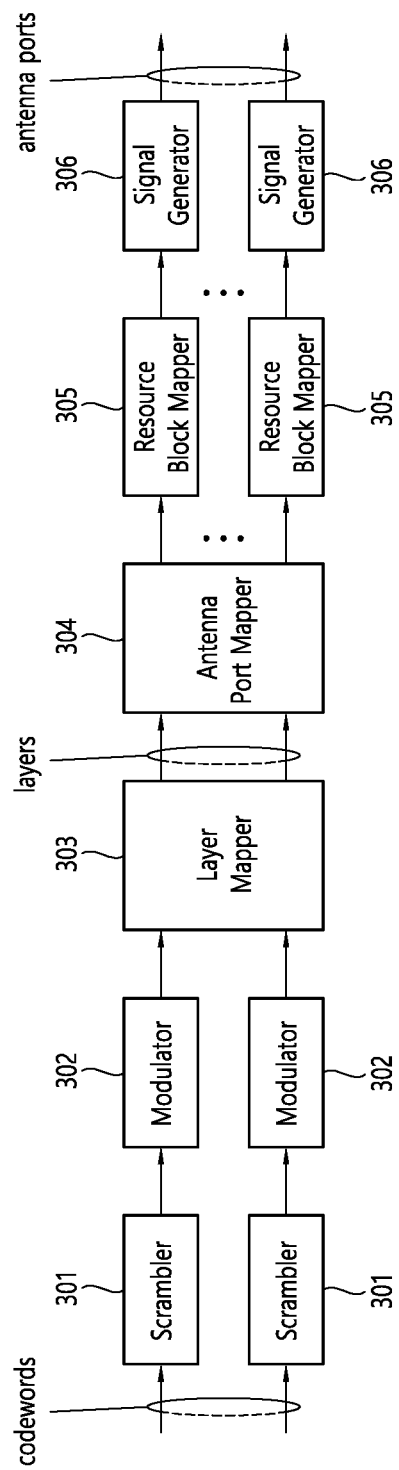
FIG. 18 illustrates an example of a signal processing module structure in the transmitting device.

FIG. 18 illustrates an example of a signal processing module structure in the transmitting device 1810. Here, signal processing can be performed by a processor of a base station/terminal, such as the processors 1811 and 1821 of FIG. 18.

Referring to FIG. 18, the transmitting device 1810 included in a terminal or a base station may include scramblers 301, modulators 302, a layer mapper 303, an antenna port mapper 304, resource block mappers 305 and signal generators 306.

The transmitting device 1810 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 19:
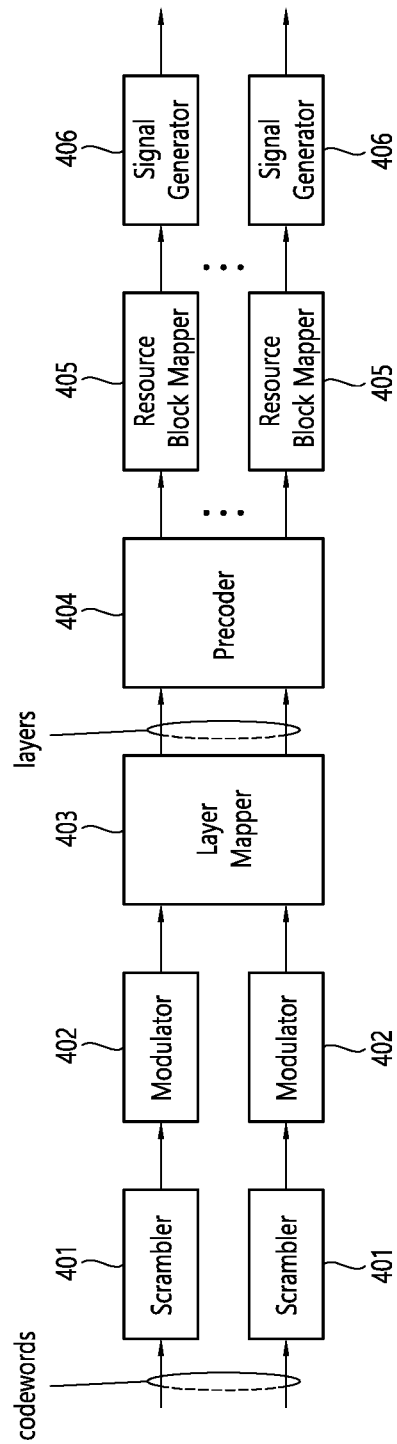
FIG. 19 illustrates another example of the signal processing module structure in the transmitting device.

FIG. 19 illustrates another example of the signal processing module structure in the transmitting device 1810. Here, signal processing can be performed by a processor of a terminal/base station, such as the processors 1811 and 1821 of FIG. 17.

Referring to FIG. 19, the transmitting device 1810 included in a terminal or a base station may include scramblers 401, modulators 402, a layer mapper 403, a precoder 404, resource block mappers 405 and signal generators 406.

The transmitting device 1810 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N*M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device 1820 may be reverse to the signal processing procedure of the transmitting device. Specifically, the processor 1821 of the transmitting device 1810 decodes and demodulates RF signals received through antenna ports of the transceiver 1822. The receiving device 1820 may include a plurality of reception antennas, and signals received through the reception antennas are restored to baseband signals, and then multiplexed and demodulated according to MIMO to be restored to a data string intended to be transmitted by the transmitting device 1810. The receiving device 1820 may include a signal restoration unit which restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit which removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 20:
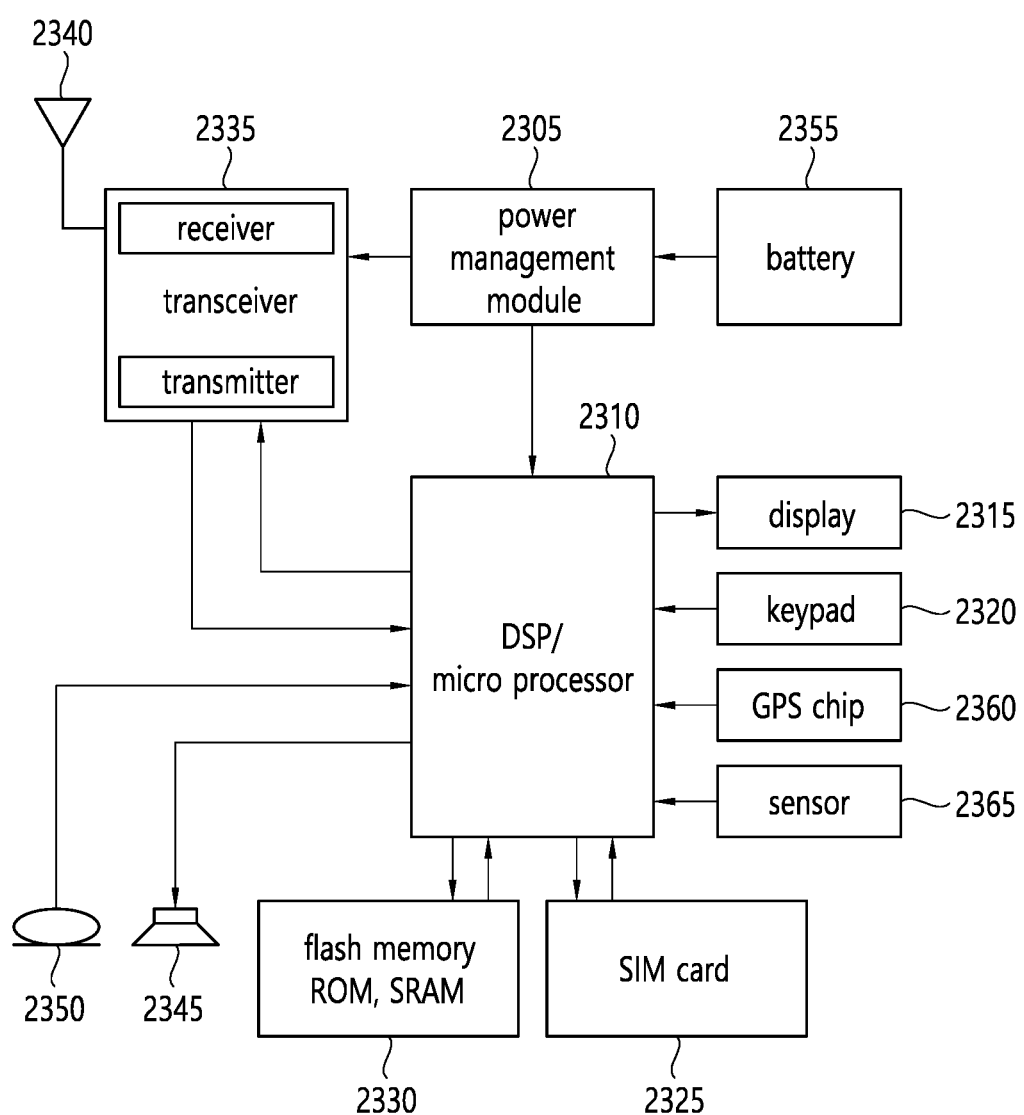
FIG. 20 illustrates an example of a wireless communication device according to an implementation example of the present disclosure.

FIG. 20 illustrates an example of a wireless communication device according to an implementation example of the present disclosure.

Referring to FIG. 20, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker and a microphone 2350. A plurality of antennas and a plurality of processors may be provided.

The processor 2310 can implement functions, procedures and methods described in the present description. The processor 2310 in FIG. 20 may be the processors 1811 and 1821 in FIG. 17.

The memory 2330 is connected to the processor 2310 and stores information related to operations of the processor. The memory may be located inside or outside the processor and connected to the processor through various techniques such as wired connection and wireless connection. The memory 2330 in FIG. 20 may be the memories 1813 and 1823 in FIG. 17.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 20 may be the transceivers 1812 and 1822 in FIG. 17.

Although not shown in FIG. 20, various components such as a camera and a universal serial bus (USB) port may be additionally included in the terminal. For example, the camera may be connected to the processor 2310.

FIG. 20 is an example of implementation with respect to the terminal and implementation examples of the present disclosure are not limited thereto. The terminal need not essentially include all the components shown in FIG. 20. That is, some of the components, for example, the keypad 2320, the GPS chip 2360, the sensor 2365 and the SIM card 2325 may not be essential components. In this case, they may not be included in the terminal.

Figure 21:
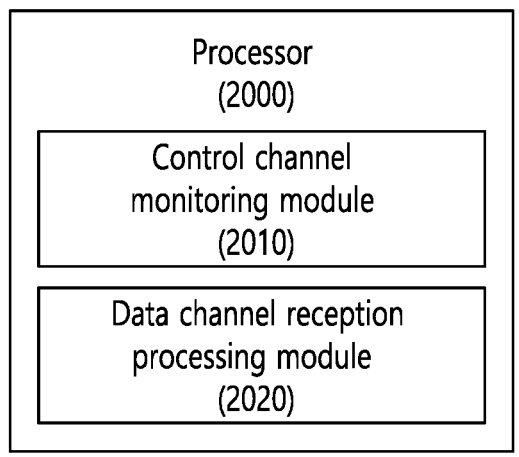
FIG. 21 shows an example of the processor.

FIG. 21 shows an example of the processor 2000.

Referring to FIG. 21, the processor 2000 may include a control channel monitoring module 2010 and a data channel reception processing module 2020. The processor 2000 may execute the methods explained with reference to FIGS. 14 to 16 (from the point of view of the receiver). For example, the processor 2000 receives first configuration information for a search space of a first cell and second configuration information for a search space of a second cell, and monitors scheduling information for the second cell in the search space of the first cell. The number of PDCCH candidates to be applied for monitoring the scheduling information in the search space of the first cell may be set based on the second configuration information. The processor 2000 may be an example of the processors 1811 and 1821 of FIG. 17.

Figure 22:
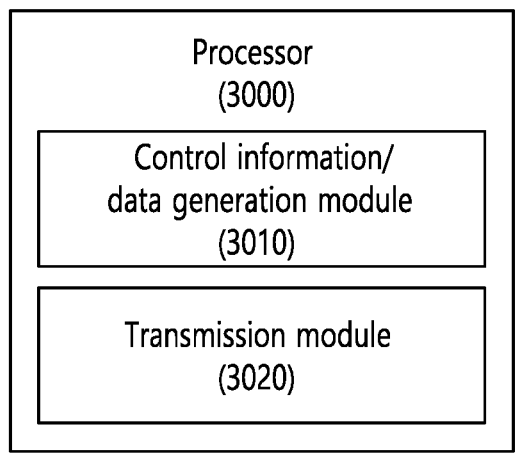
FIG. 22 shows an example of the processor.

FIG. 22 shows an example of the processor 3000.

Referring to FIG. 22, the processor 3000 may include a control information/data generation module 3010 and a transmission module 3020. The processor 3000 may execute the methods explained from the point of view of the transmitter with reference to FIGS. 14 to 16. For example, the processor 3000 may generate and transmit configuration information for search spaces of cells and data to be transmitted through a data channel. The processor may be an example of the processors 1811 and 1821 of FIG. 17.

Figure 23:
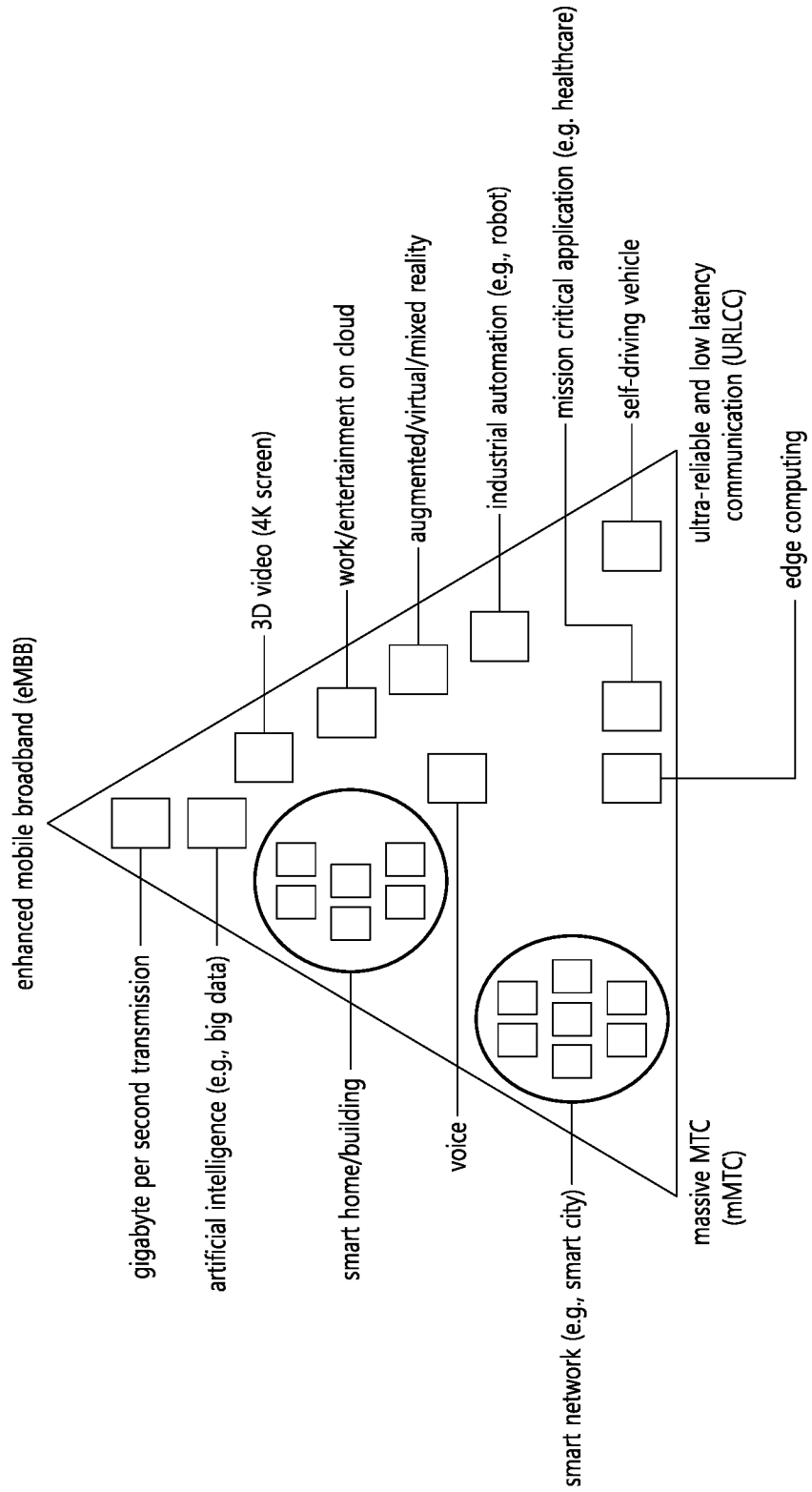
FIG. 23 shows an example of a 5G usage scenario to which the technical features of the present disclosure may be applied.

FIG. 23 shows an example of a 5G usage scenario to which the technical features of the present disclosure may be applied.

The 5G usage scenario shown in FIG. 23 is exemplary only, and the technical features of the present disclosure are applicable to other 5G usage scenarios not shown in FIG. 23.

Referring to FIG. 23, the three major requirements areas of 5G include (1) an enhanced mobile broadband (eMBB) domain, (2) a massive machine type communication (mMTC) domain, and 3) and (3) a ultra-reliable and low latency communications (URLLC) domain. Some use examples may require multiple areas for optimization and other use examples may only focus on only one key performance indicator (KPI). 5G is to support these various use examples in a flexible and reliable way.

eMBB focuses on the overall improvement of data rate, latency, user density, capacity and coverage of mobile broadband connections. The eMBB aims at a throughput of about 10 Gbps. The eMBB far surpasses basic mobile Internet access and covers media and entertainment applications in rich interactive work, cloud or augmented reality. Data is one of the key drivers of 5G and may not be able to see dedicated voice services for the first time in the 5G era. In 5G, the voice is expected to be processed as an application simply using the data connection provided by the communication system. The main reason for the increased amount of traffic is an increase in the size of the content and an increase in the number of applications requiring high data rates. Streaming services (audio and video), interactive video and mobile Internet connections will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special example of driving up the growth of uplink data rates. 5G is also used for remote tasks on the cloud and requires much lower end-to-end latency to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use example is augmented reality and information retrieval for entertainment. Here, augmented reality requires very low latency and instantaneous data amount.

The mMTC is designed to enable communication between a large amount of low-cost devices powered by batteries and is intended to support applications such as smart metering, logistics, field and body sensors. The mMTC is aimed at a 10 year battery and/or a million devices per square kilometer. The mMTC allows smooth connection of embedded sensors in all areas and is one of the most widely used 5G applications. Potentially by 2020, IoT devices are expected to reach 20.4 billion. Industry IoT is one of the areas where 5G plays a key role in enabling smart cities, asset tracking, smart utilities, agriculture and security infrastructures.

URLLC is ideal for automotive communications, industrial control, factory automation, remote surgery, smart grid and public safety applications by allowing devices and machines to communicate with high reliability, very low latency and high availability. The URLLC aims at a latency of about 1 ms. The URLLC includes new services that will change the industry through remote control of key infrastructures and ultra-trusted/low latency links such as autonomous driving vehicles. The level of reliability and latency is essential for smart grid control, industrial automation, robotics, drone control and coordination.

Next, a plurality of use examples included in the triangle of FIG. 23 will be described in more detail.

5G is a means to provide streams evaluated as hundreds of megabits per second and gigabits per second and may complement fiber-to-the-home (FTTH) and cable-based broadband (or DOCSIS). This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize latency.

Automotive is expected to become an important new driver for 5G, with many use examples for mobile communications to vehicles. For example, entertainment for passengers demands high capacity and high mobile broadband at the same time. This is because future users will continue to expect high-quality connections regardless of their location and speed. Another use example in the automotive sector is an augmented reality dashboard. The driver can identify an object in the dark on top of what is being viewed through the front window through the augmented reality dash board. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that the driver can drive more safely, thereby reducing the risk of accidents. The next step would be a remote control vehicle or an autonomous driving vehicle. This is very reliable and requires very fast communication between different autonomous driving vehicles and/or between cars and infrastructures. In the future, an autonomous driving vehicle will perform all driving activities, and the driver will focus only on unusual traffic situations that the vehicle itself cannot identify. The technical requirements of autonomous driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each assumption. Temperature sensors, windows and heating controllers, burglar alarms and appliances are all wirelessly connected. Many of these sensors typically require low data rates, low power and low cost. However, for example, real-time HD video may be required for certain types of devices for monitoring.

The consumption and distribution of energy, including heat or gas, is highly dispersed, thereby requiring automated control of distributed sensor networks. The smart grid interconnects these sensors using digital information and communication technologies to collect information and act according to the information. This information can include supplier and consumer behavior, allowing the smart grid to improve efficiency, reliability, economy, sustainability of production, and the distribution of fuel such as electricity by the automated scheme. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar latency, reliability, and capacity as cables and that their management is simplified. Low latency and very low error probabilities are new requirements that need to be connected to 5G.

Logistics and cargo tracking is an important use example for mobile communications enabling the tracking of inventory and packages anywhere using location based information systems. Use examples of logistics and cargo tracking typically require low data rates, but require large range and reliable location information.

Figure 24:
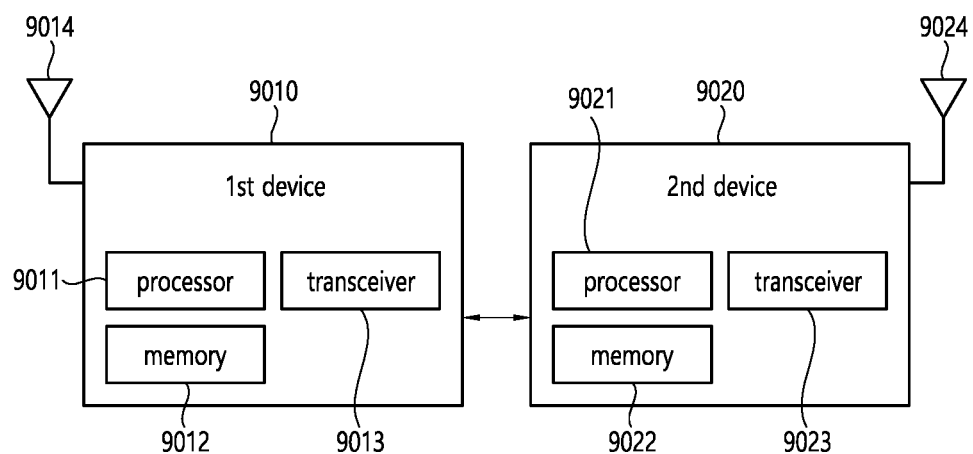
FIG. 24 shows a wireless communication apparatus according to an embodiment of the present disclosure.

FIG. 24 shows a wireless communication apparatus according to an embodiment of the present disclosure.

Referring to FIG. 24, a wireless communication system may include a first device 9010 and a second device 9020.

The first device 9010 may be a base station, a network node, a transmitting UE, a receiving UE, a wireless device, a wireless communication device, a vehicle, a vehicle equipped with an autonomous driving function, a connected car, a drone (unmanned aerial vehicle (UAV)), an artificial intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or a financial device), a security device, a climate/environment device, a device related to 5G services, or another device related to 4th Industrial Revolution.

The second device 9020 may be a base station, a network node, a transmitting UE, a receiving UE, a wireless device, a wireless communication device, a vehicle, a vehicle equipped with an autonomous driving function, a connected car, a drone (unmanned aerial vehicle (UAV)), an artificial intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or a financial device), a security device, a climate/environment device, a device related to 5G services, or another device related to 4th Industrial Revolution.

For example, the UE may be a mobile phone, a smart phone, a laptop computer, a digital broadcasting terminal, a personal digital assistant (PDA), a portable multimedia player (PMP), a navigation device, a slate PC, a tablet PC, an ultrabook, a wearable device (e.g., a smart watch, a smart glass, a head mounted display (HMD)), etc. For example, the HMD may be a display device worn on the head. For example, an HMD can be used to implement VR, AR, or MR.

For example, the drone can be a flying object that has no seat for people but that fly by radio control signals. For example, the VR device may include a device that implements an object or background in the virtual world. For example, the AR device may include an apparatus for connecting an object or a background of a virtual world to an object or a background of the real world. For example, the MR device may include a device that fuses an object or background of a virtual world with as an object or a background of the real-world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that can be worn by the user. For example, the MTC device and the IoT device may be devices that do not require direct human intervention or manipulation. For example, the MTC device and the IoT device may include a smart meter, a bending machine, a thermometer, a smart bulb, a door lock or various sensors. For example, the medical device may be a device used for diagnosing, treating, alleviating, treating, or preventing a disease. For example, the medical device may be a device used for the purpose of diagnosing, treating, alleviating, or correcting an injury or disorder. For example, a medical device may be a device used for the purpose of inspecting, replacing or modifying a structure or function. For example, the medical device may be a device used for the purpose of controlling pregnancy. For example, the medical device may include a medical device, a surgical device, an (in vitro) diagnostic device, a hearing aid or a surgical device, and the like. For example, a security device may be a device installed to prevent the risk that may occur and to maintain safety. For example, the security device may be a camera, a CCTV, a recorder, or a black box. For example, the FinTech device may be a device capable of providing financial services such as mobile payment. For example, the FinTech device may include a payment device or a point of sale (POS). For example, the climate/environmental device may include a device for monitoring or predicting the climate/environment.

The first device 9010 may include one or more processors including a processor 9011, at least one memory including a memory 9012, and at least one transceiver including a transceiver 9013. The processor 9011 may perform the functions, procedures, and/or methods described above. The processor 9011 may perform one or more protocols. For example, the processor 9011 may perform one or more layers of the wireless interface protocol. The memory is connected to the processor 9011 and may store various types of information and/or instructions. The transceiver 9013 is connected to the processor 9011 and can be controlled to transmit and receive wireless signals.

The second device 9020 may include at least one processor including a processor 9021, at least one memory device including a memory 9022, and at least one transceiver including a transceiver 9023. The processor 9011 may perform the functions, procedures, and/or methods described above. The processor 9021 may implement one or more protocols. For example, the processor 9021 may implement one or more layers of a wireless interface protocol. The memory 9022 is coupled to the processor 9021 and may store various types of information and/or instructions. The transceiver 9023 is connected to the processor 9021 and can be controlled to transmit and receive wireless signals.

The memory 9012 and/or the memory 9022 may be coupled internally or externally to the processor 9011 and/or the processor 9021, or may be connected to other processors through a variety of technologies such as wired or wireless connections.

The first device 9010 and/or the second device 9020 may have more than one antenna. For example, antenna 9014 and/or antenna 9024 may be configured to transmit and receive wireless signals.

The present disclosure may be applied to the following fields.

<Artificial Intelligence (AI)>

Artificial intelligence may refer to a field of studying methodology for making artificial intelligence. Machine learning may refer to a field of studying methodologies for defining and solving various problems which are dealt in artificial intelligence. Machine learning is defined as an algorithm that enhances the performance of a task through a steady experience.

An artificial neural network (ANN) is a model used in machine learning. It can mean a whole model having problem-solving ability, consisting of artificial neurons (nodes) that form a network of synapses. The artificial neural network can be defined by a connection pattern between neurons in different layers, a learning process for updating model parameters, and an activation function for generating an output value.

The artificial neural network may include an input layer, an output layer, and optionally one or more hidden layers. Each layer contains one or more neurons, and an artificial neural network may include a synapse that links neurons to neurons. In an artificial neural network, each neuron can output input signals that are input through the synapse, weight, and function value of the active function for bias.

Model parameters are parameters determined through learning, including weighting of synaptic connections and deflection of neurons. The hyper parameter means a parameter to be set in the machine learning algorithm before learning, and includes a learning rate, a repetition number, a mini batch size, an initialization function, and the like.

The objective of the artificial neural network learning can be seen as determining the model parameters that minimize the loss function. The loss function can be used as an index to determine optimal model parameters in the learning process of artificial neural networks.

Machine learning can be divided into Supervised Learning, Unsupervised Learning, and Reinforcement Learning depending on the learning method.

Guide learning is a method of learning artificial neural networks with labels about learning data given. Labels may mean the answers (or result values) that artificial neural networks should infer when learning data is input to artificial neural networks. Non-guide learning can mean a method of learning an artificial neural network without labels about learning data given. Reinforcement learning can mean a learning method in which an agent defined in an environment learns to select a behavior or sequence of actions that maximizes cumulative compensation in each state.

Machine learning implemented as a Deep Neural Network (DNN) that includes multiple hidden layers among artificial neural networks is also called a deep learning, and the deep learning is a part of machine learning. In the following, the term "machine learning" includes deep learning.

<Robot>

A robot can mean a machine that automatically processes or operates a given task by its own abilities. In particular, a robot having a function of recognizing the environment and performing self-determination and operation can be referred to as an intelligent robot.

Robots can be classified into industrial, medical, household, or military robots, etc. depending on the purpose and field of use.

The robot includes a driving unit including an actuator or a motor to perform various physical operations such as moving a robot joint. In addition, the movable robot includes a wheel, a brake, a propeller, and the like in a driving unit, and can travel on the ground or fly in the air through the driving unit.

<Self-Driving (Autonomous Driving)>

The term "autonomous driving" refers to a technology of self-driving, and the term "autonomous driving vehicle" refers to a vehicle that travels without a user's operation or with a minimum operation of a user.

For example, autonomous driving includes technologies for maintaining a lane while driving, technologies for automatically controlling speed such as adaptive cruise control, technologies for automatically traveling along a predetermined route, and technologies for automatically setting a route when a destination is set.

The vehicle includes a vehicle having only an internal combustion engine, a hybrid vehicle having an internal combustion engine and an electric motor together, and an electric vehicle having only an electric motor, and may include not only an automobile but also a train, a motorcycle and the like.

At this time, the autonomous driving vehicle can be regarded as a robot having an autonomous driving function.

<eXtended Reality (XR)>

Extended realities collectively include Virtual Reality (VR), Augmented Reality (AR), and Mixed Reality (MR). VR technology provides real-world objects and backgrounds only as CG images, AR technology provides CG images which are virtually made on real object images, and MR technology mixes and combines virtual objects in the real world.

MR technology is similar to AR technology in that it shows real and virtual objects together. However, in the AR technology, the virtual object is used as a complement to the real object, but in the MR technology, the virtual object and the real object are used in an equal manner.

XR technology can be applied to head-mounted display (HMD), head-up display (HUD), mobile phone, tablet PC, laptop, desktop, TV, digital signage, etc., and a device to which the XR technology is applied may be referred to as an XR device.

Figure 25:
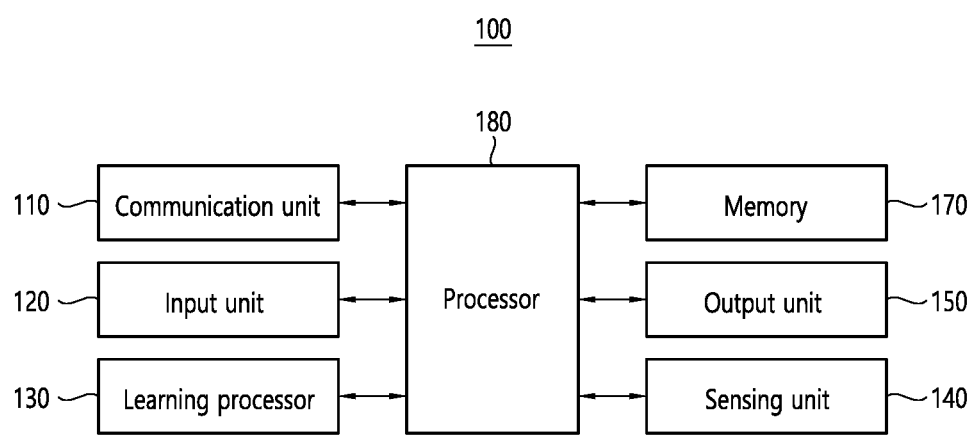
FIG. 25 shows an AI device 100 according to an embodiment of the present disclosure.

FIG. 25 shows an AI device 100 according to an embodiment of the present disclosure.

At least one method and/or apparatus of the above-described methods of the disclosure may be applied/included in the AI device. The AI device 100 may be implemented as a fixed device or a mobile device such as a TV, a projector, a mobile phone, a smart phone, a desktop computer, a notebook, a digital broadcasting terminal, a personal digital assistant (PDA), a portable multimedia player (PMP), a navigation device, a tablet PC, a wearable device, a set top box (STB), a DMB receiver, a radio, a washing machine, a refrigerator, a desktop computer, a digital signage, a robot, a vehicle, or the like.

Referring to FIG. 25, the UE 100 includes a communication unit 110, an input unit 120, a learning processor 130, a sensing unit 140, an output unit 150, a memory 170, and a processor 180.

The communication unit 110 can transmit and receive data to and from external devices such as the AI devices 100a to 100e and the AI server 200 by using wire/wireless communication technology. For example, the communication unit 110 can transmit and receive sensor information, a user input, a learning model, a control signal, and the like with external devices.

The communication technology used by the communication unit 110 includes a Global System for Mobile communication (GSM), a Code Division Multi Access (CDMA), a Long Term Evolution (LTE), a 5G, a Wireless LAN (WLAN), Bluetooth, Radio Frequency Identification (RFID), Infrared Data Association (IrDA), ZigBee, and Near Field Communication (NFC).

The input unit 120 can acquire various kinds of data.

At this time, the input unit 120 may include a camera for inputting a video signal, a microphone for receiving an audio signal, and a user input unit which receives information from a user. Here, a camera or a microphone may be treated as a sensor, and a signal obtained from the camera or the microphone may be referred to as sensing data or sensor information.

The input unit 120 can acquire input data and the like to be used when acquiring an output using learning data and a learning model for model learning. The input unit 120 may obtain raw input data, in which case the processor 180 or the learning processor 130 may extract input features by pre-processing the input data.

The learning processor 130 may learn a model composed of an artificial neural network using learning data. Here, the learned artificial neural network can be referred to as a learning model. The learning model can be used to infer result values for new input data rather than learning data, and the inferred values can be used as a basis for determining which actions to perform.

At this time, the learning processor 130 may perform AI processing together with the learning processor 240 of the AI server 200.

At this time, the learning processor 130 may include memory integrated or implemented in the AI device 100. Alternatively, the learning processor 130 may be implemented using memory 170, an external memory directly coupled to the AI device 100, or a memory maintained in an external device.

The sensing unit 140 may acquire at least one of internal information of AI device 100, surrounding environment information of the AI device 100, and user information using various sensors.

The sensor included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, radar.

The output unit 150 may generate an output related to visual information, auditory information, tactile information, or the like.

At this time, the output unit 150 may include a display unit which outputs visual information, a speaker for outputting auditory information, and a haptic module for outputting tactile information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device based on information determined or generated using a data analysis algorithm or a machine learning algorithm. The processor 180 may then control the components of the AI device 100 to perform the determined operation.

To this end, the processor 180 may request, retrieve, receive, or utilize data in the learning processor 130 or the memory 170 and may control the components of the AI device to execute the predicted operation or the operation determined to be desirable among the at least one executable operation.

At this time, the processor 180 may generate a control signal for controlling the external device and transmit the generated control signal to the external device if the external device needs to be linked to perform the determined operation.

The processor 180 may obtain the intention information for the user input and determine the user's requirements based on the obtained intention information.

At this time, the processor 180 may acquire intention information corresponding to a user input by using at least one of a Speech To Text (STT) engine for converting a speech input into a string or a Natural Language Processing (NLP) engine for acquiring intention information of a natural language.

At this time, at least one of the STT engine or the NLP engine may be configured as an artificial neural network, at least a part of which is learned according to a machine learning algorithm. At least one of the STT engine and the NLP engine may be one learned by the learning processor 130 or learned by the learning processor 240 of the AI server 200, or may have been learned by dispersion processing of these.

The processor 180 collects history information including the operation of the AI device or the user's feedback on the operation and stores the collected history information in the memory 170 or the learning processor 130, or the information may be transmitted to an external device such as the AI server 200. The collected history information can be used to update the learning model.

The processor 180 may control at least some of the components of AI device 100 to drive an application program stored in memory 170. Further, the processor 180 may operate two or more of the components included in the AI device 100 in combination with each other in order to drive the application program.

Figure 26:
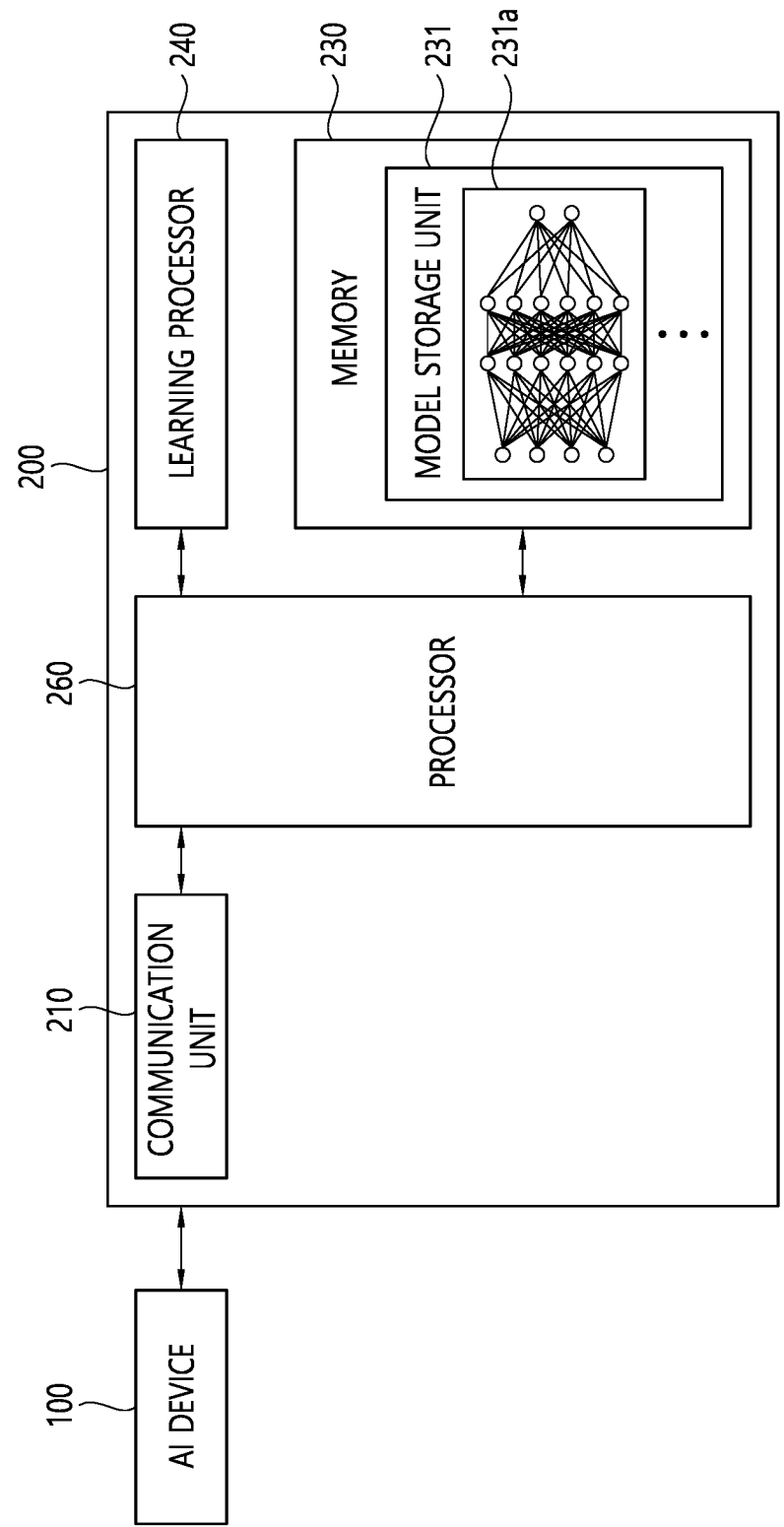
FIG. 26 shows an AI server 200 according to an embodiment of the present disclosure.

FIG. 26 shows an AI server 200 according to an embodiment of the present disclosure.

Referring to FIG. 26, the AI server 200 may refer to a device that learns an artificial neural network using a machine learning algorithm or uses a learned artificial neural network. Here, the AI server 200 may be composed of a plurality of servers to perform distributed processing, or may be defined as a 5G network. At this time, the AI server 200 may be included in a configuration of a part of the AI device 100, and may perform at least a part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a currently learning or already learned model (or an artificial neural network, 231a) through the learning processor 240.

The learning processor 240 can train the artificial neural network 231a using the learning data. The learning model may be used in a state where it is mounted on the AI server of the artificial neural network, or may be used by being loaded on an external device such as the AI device 100 or the like.

The learning model may be implemented in hardware, software, or a combination of hardware and software. If some or all of the learning models are implemented in software, one or more instructions that constitute the learning model may be stored in the memory 230.

The processor 260 may infer the result value for new input data using the learning model and generate a response or control command based on the inferred result value.

Figure 27:
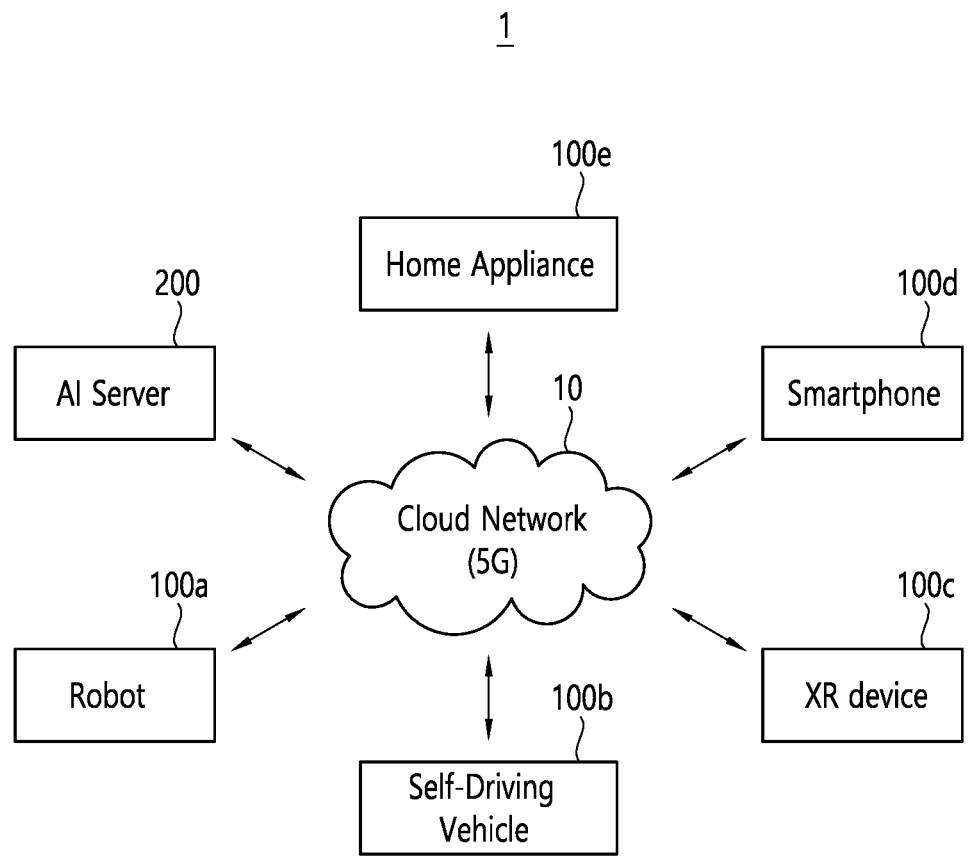
FIG. 27 shows an AI system 1 according to an embodiment of the present disclosure.

FIG. 27 shows an AI system 1 according to an embodiment of the present disclosure.

Referring to FIG. 27, in the AI system 1, at least one of the AI server 200, the robot 100a, the autonomous driving vehicle 100b, the XR apparatus 100c, the smartphone 100d or the household appliance 100e is connected to the cloud network 10. Here, the robot 100a, the autonomous driving vehicle 100b, the XR apparatus 100c, the smartphone 100d, or the household appliance 100e to which the AI technology is applied may be referred to as AI devices 100a to 100e.

The cloud network 10 may refer to a network that forms part of a cloud computing infrastructure or resides in a cloud computing infrastructure. Here, the cloud network 10 may be configured using a 3G network, a 4G or Long Term Evolution (LTE) network or a 5G network.

That is, each of the devices 100a to 100e and 200 constituting the AI system 1 may be connected to each other through the cloud network 10. In particular, each of the devices 100a to 100e and 200 may communicate with each other through a base station, but may directly communicate with each other without using a base station.

The AI server 200 may include a server for performing AI processing and a server for performing operations on big data.

The AI server 200 is connected to one or more of the AI devices constituting the AI system 1, that is, the robot 100a, the autonomous driving vehicle 100b, the XR apparatus 100c, the smartphone 100d, and the home appliance 100e and may assist at least some AI processing of the connected AI devices 100a through 100e.

At this time, the AI server 200 can train the artificial neural network according to the machine learning algorithm on behalf of the AI devices 100a to 100e, and can directly store the learning model or transmit the learning model to the AI devices 100a to 100e.

At this time, the AI server 200 receives the input data from the AI devices 100a through 100e, infer the result value with respect to the received input data using the learning model, and outputs a response or a control command based on the inferred result value and transmit the response or the control command to AI devices 100a through 100e.

Alternatively, the AI devices 100a through 100e may infer a result value for the input data using a direct learning model, and generate a response or a control command based on the result of the inference.

Hereinafter, various embodiments of AI devices 100a to 100e to which the above-described technology is applied will be described. Here, the AI devices 100a to 100e shown in FIG. 27 can be seen as specific embodiments of the AI device 100 shown in FIG. 25.

<AI+Robot>

The robot 100a may be implemented as a guide robot, a carrying robot, a cleaning robot, a wearable robot, an entertainment robot, a pet robot, an unmanned flying robot, or the like, to which AI technology is applied.

The robot 100a may include a robot control module for controlling the operation, and the robot control module may refer to a software module or a chip implementing it in hardware.

The robot 100a may acquire the state information of the robot 100a using the sensor information acquired from various kinds of sensors, detect (recognize) the surrounding environment and the object, generate map data, determine a travel route and a travel plan, determine a response to user interaction, or determine an operation.

Here, the robot 100a can use the sensor information acquired from at least one sensor among the lidar, the radar, and the camera to determine the travel route and the travel plan.

The robot 100a can perform the above-described operations using a learning model composed of at least one artificial neural network. For example, the robot 100a can recognize the surrounding environment and the object using the learning model, and can determine the operation using the recognized surrounding environment information or the object information. Here, the learning model may be learned directly from the robot 100a or learned from an external device such as the AI server 200.

At this time, the robot 100a may generate the result using the direct learning model to perform the operation. However, the robot 100a may transmit the sensor information to the external device such as the AI server 200 and receive the generated result according thereto to thereby performing the operation.

The robot 100a may determine the travel route and the travel plan using at least one of the map data, the object information detected from the sensor information or the object information acquired from the external device, and control the driving unit to move the robot 100a according to the determined travel route and travel plan.

The map data may include object identification information on various objects arranged in a space in which the robot 100a moves. For example, the map data may include fixed objects such as walls and doors, and object identification information on movable objects such as a flowerpot and a desk. The object identification information may include a name, a type, a distance, and a position.

In addition, the robot 100*a* can perform the operation or run by controlling the driving unit based on the control/interaction of the user. At this time, the robot 100*a* may acquire the intention information of the interaction due to the user's operation or voice utterance, determine the response based on the acquired intention information, and perform the operation.

<AI+Autonomous Driving>

The autonomous driving vehicle 100*b* may be implemented as a mobile robot, a vehicle, an unmanned aerial vehicle, or the like, to which AI technology is applied.

The autonomous driving vehicle 100*b* may include an autonomous drive control module for controlling the autonomous driving function, and the autonomous drive control module may refer to a software module or a chip implementing the software module in hardware. The autonomous-drive control module may be included in the autonomous driving vehicle 100*b* as a component of the autonomous driving vehicle 100*b*, but may be connected to the outside of the autonomous driving vehicle 100*b* by a separate hardware.

The autonomous driving vehicle 100*b* can acquire the state information of the autonomous driving vehicle 100*b* using the sensor information acquired from various kinds of sensors, detect (recognize) the surrounding environment and objects, generate map data, determine a travel route and a travel plan, or determine an operation.

Here, the autonomous driving vehicle 100*b* can use the sensor information acquired by at least one of the sensors such as the lidar, the radar, and the camera in the same manner as the robot 100*a* in order to determine the travel route and the travel plan.

In particular, the autonomous driving vehicle 100*b* can receive or recognize sensor information from external devices or receive information directly recognized from external devices with respect to an environment or an object for an area in which the field of view is obscured or an area located away by more than a certain distance.

The autonomous driving vehicle 100*b* may perform the above-described operations using a learning model composed of at least one artificial neural network. For example, the autonomous driving vehicle 100*b* can recognize the surrounding environment and the object by using the learning model, and can determine the travel route by using the recognized surrounding information or object information. Here, the learning model may be learned directly from the autonomous driving vehicle 100*b* or learned from an external device such as the AI server 200.

At this time, the autonomous driving vehicle 100*b* may generate the result using the direct learning model to perform the operation. However, the robot 100*a* may transmit the sensor information to the external device such as the AI server 200 and receive the generated result according thereto to thereby performing the operation.

The autonomous driving vehicle 100*b* may determine the travel route and the travel plan using at least one of the map data, the object information detected from the sensor information or the object information acquired from the external device, and control the driving unit to move the autonomous driving vehicle 100*b* according to the determined travel route and travel plan.

The map data may include object identification information on various objects disposed in a space (e.g., a road) where the autonomous driving vehicle 100*b* runs. For example, the map data may include fixed objects such as street lamps, rocks, and buildings, and object identification information on movable objects such as vehicles and pedestrians. The object identification information may include a name, a type, a distance, and a position.

In addition, the autonomous driving vehicle 100*b* can perform the operation or run by controlling the driving unit based on the control/interaction of the user. At this time, the autonomous driving vehicle 100*b* may acquire the intention information of the interaction due to the user's operation or voice utterance, determine the response based on the acquired intention information, and perform the operation.

<AI+XR>

The XR apparatus 100*c* can be implemented as a head-mount display (HMD), a head-up display (HUD), a television, a mobile phone, a smart phone, a computer, a wearable device, a home appliance, a digital signage, a vehicle, a fixed robot or a mobile robot, to which AI technology is applied.

The XR apparatus 100*c* may analyze the three-dimensional point cloud data or image data acquired from various sensors or an external device to generate position data and attribute data for the three-dimensional points, thereby obtaining information about the surrounding space or the real object, and rendering an XR object to be outputted and output the rendered XR object. For example, the XR apparatus 100*c* may allow an XR object including the additional information about the recognized object to corresponding to the recognized object, to thereby be outputted.

The XR apparatus 100*c* can perform the above-described operations using a learning model composed of at least one artificial neural network. For example, the XR apparatus 100*c* can recognize a real object from three-dimensional point cloud data or image data using a learning model, and can provide information corresponding to the recognized real object. Here, the learning model may be learned directly from the XR apparatus 100*c* or learned from an external device such as the AI server 200.

At this time, the XR apparatus 100*c* may generate the result using the direct learning model to perform the operation. However, the robot 100*a* may transmit the sensor information to the external device such as the AI server 200 and receive the generated result according thereto to thereby performing the operation.

<AI+Robot+Autonomous Driving>

The robot 100*a* may be implemented as a guide robot, a carrying robot, a cleaning robot, a wearable robot, an entertainment robot, a pet robot, an unmanned flying robot, or the like, to which AI technology and autonomous driving technology are applied.

The robot 100*a* to which the AI technology and the autonomous driving technology are applied may mean the robot itself having the autonomous driving function or the robot 100*a* interacting with the autonomous driving vehicle 100*b*.

The robot 100*a* having the autonomous driving function can collectively refer to devices that move by themselves according to a given route without user's control or determine the route by themselves and move according to the determined route.

The robot 100*a* having the autonomous driving function and the autonomous driving vehicle 100*b* can use a common sensing method to determine at least one of the travel route or the travel plan. For example, the robot 100*a* having the autonomous driving function and the autonomous driving vehicle 100*b* can determine at least one of the travel route or the travel plan using the information sensed through the lidar, the radar, and the camera.

The robot 100a interacting with the autonomous driving vehicle 100b may be independent of the autonomous driving vehicle 100b and may be linked to the autonomous driving function inside or outside the autonomous driving vehicle 100b, or may perform an operation associated with the user who has boarded the vehicle.

At this time, the robot 100a interacting with the autonomous driving vehicle 100b may acquire sensor information on behalf of the autonomous driving vehicle 100b and provide the sensor information to the autonomous driving vehicle 100b, or may acquire sensor information and generate surrounding environment information or object information and provide the information to the autonomous driving vehicle 100b, thereby controlling or assisting the autonomous driving function of the autonomous driving vehicle 100b.

Alternatively, the robot 100a interacting with the autonomous driving vehicle 100b may monitor the user boarding the autonomous driving vehicle 100b or may control the functions of the autonomous driving vehicle 100b through interaction with the user. For example, when it is determined that the driver is in a drowsy state, the robot 100a may activate the autonomous driving function of the autonomous driving vehicle 100b or assist the control of the driving unit of the autonomous driving vehicle 100b. The function of the autonomous driving vehicle 100b controlled by the robot 100a may include not only an autonomous driving function but also functions provided by a navigation system or an audio system provided in the autonomous driving vehicle 100b.

Alternatively, the robot 100a interacting with the autonomous driving vehicle 100b may provide information to the autonomous driving vehicle 100b outside the autonomous driving vehicle 100b or assist the function. For example, the robot 100a may provide traffic information including signal information and the like to the autonomous driving vehicle 100b, such as a smart signal, or may interact with the autonomous driving vehicle 100b, such as an automatic electric charger of an electric vehicle to thereby connect the electric charger to a charging hole automatically.

<AI+Robot+XR>

The robot 100a may be implemented as a guide robot, a carrying robot, a cleaning robot, a wearable robot, an entertainment robot, a pet robot, an unmanned flying robot, a drone or the like, to which AI technology and XR technology are applied.

The robot 100a to which the XR technology is applied may refer to a robot that is subject to control/interaction in the XR image. In this case, the robot 100a is separated from the XR apparatus 100c and can be interlocked with each other.

When the robot 100a to be controlled/interacted within the XR image acquires the sensor information from the sensors including the camera, the robot 100a or the XR apparatus 100c can generate the XR image based on the sensor information and the XR apparatus 100c can output the generated XR image. The robot 100a can operate based on a control signal input through the XR apparatus 100c or a user's interaction.

For example, the user can confirm the XR image corresponding to the viewpoint of the robot 100a remotely interlocked through an external device such as the XR apparatus 100c, and adjust the autonomous travel route of the robot 100a through the interaction, control the operation or the movement, or check the information of the neighboring objects.

<AI+Autonomous Driving+XR>

The autonomous driving vehicle 100b may be implemented as a mobile robot, a vehicle, an unmanned aerial vehicle, or the like, to which AI technology and XR technology are applied.

The autonomous driving vehicle 100b to which the XR technology is applied may mean an autonomous driving vehicle having a means for providing an XR image or an autonomous driving vehicle to be controlled/interacted in an XR image. Particularly, the autonomous driving vehicle 100b to be controlled/interacted within the XR image can be separated from the XR apparatus 100c and interlocked with each other.

The autonomous driving vehicle 100b having the means for providing the XR image can acquire the sensor information from the sensors including the camera and output the XR image generated based on the acquired sensor information. For example, the autonomous driving vehicle 100b may include an HUD to output an XR image, thereby providing a passenger with an XR object corresponding to a real object or an object in the screen.

At this time, when the XR object is outputted to the HUD, at least a part of the XR object may be outputted so as to overlap with the real object that the passenger's gaze is directed to. On the other hand, when the XR object is output to the display provided in the autonomous driving vehicle 100b, at least a part of the XR object may be output so as to overlap with the object in the screen. For example, the autonomous driving vehicle 100b may output XR objects corresponding to objects such as a lane, another vehicle, a traffic light, a traffic sign, a two-wheeled vehicle, a pedestrian, a building, and the like.

When the autonomous driving vehicle 100b to be controlled/interacted within the XR image acquires the sensor information from the sensors including the camera, the autonomous driving vehicle 100b or the XR apparatus 100c can generate the XR image based on the sensor information and the XR apparatus 100c can output the generated XR image. The autonomous driving vehicle 100b may operate based on a control signal inputted through an external device such as the XR apparatus 100c, or an interaction of a user.

What is claimed is:

1. A method for monitoring scheduling information in a wireless communication system, the method comprising:
   receiving first search space configuration information for a first cell and second search space configuration information for a second cell; and
   monitoring scheduling information in a search space of the first cell based on the first search space configuration information or the second search space configuration information,
   wherein:
   in a case of cross carrier scheduling where the first cell is a scheduling cell and the second cell is a scheduled cell,
   i) a number of physical downlink control channel (PDCCH) candidates and aggregation levels to be used on the first cell is determined based on a field in the second search space configuration information, and
   ii) in the second search space configuration information, all optional fields are absent except the field.

2. The method of claim 1, wherein the field informs a value of the number of PDCCH candidates for each aggregation level.

3. The method of claim 1, wherein, based on monitoring the scheduling information for the second cell in the search space of the first cell, any information other than a number of PDCCH candidates per aggregation level is determined based on the first search space configuration information.

4. The method of claim 3, wherein the other information comprises the ID (identity) of a control resource set (CORESET) related with the search space.

5. The method of claim 1, wherein, based on monitoring scheduling information for the first cell in the search space of the first cell, the monitoring in the search space of the first cell is performed based on the first search space configuration information.

6. The method of claim 1, wherein the first cell and the second cell are cells having the same subcarrier spacing.

7. The method of claim 1, wherein the first cell and the second cell are cells having different subcarrier spacings.

8. The method of claim 1, wherein the first search space configuration information and the second search space configuration information are received through an RRC (radio resource control) signal.

9. The method of claim 1, wherein an identity (ID) of the search space of the first cell and an ID of a search space of the second cell are same as each other.

10. A user equipment (UE) comprising:
a transceiver for transmitting and receiving a radio signal; and
a processor operatively coupled to the transceiver,
wherein the processor is configured to:
receive first search space configuration information for a search space of a first cell and second search space configuration information for a search space of a second cell,
monitor scheduling information in a search space of the first cell based on the first search space configuration information or the second search space configuration information,
wherein:
in a case of cross carrier scheduling where the first cell is a scheduling cell and the second cell is a scheduled cell,
i) a number of physical downlink control channel (PDCCH) candidates and aggregation levels to be used on the first cell is determined based on a field in the second search space configuration information, and
ii) in the second search space configuration information, all optional fields are absent except the field.

11. The UE of claim 10, wherein the field informs a value of the number of PDCCH candidates for each aggregation level.

12. The UE of claim 10, wherein an identity (ID) of the search space of the first cell and an ID of a search space of the second cell are same as each other.

13. An apparatus, the apparatus comprising:
a hardware processor; and
a memory operably coupled to the hardware processor,
wherein the memory stores Instructions which when executed by the hardware processor cause a wireless communication device to:
receive first search space configuration information for a first cell and second search space configuration information for a second cell, and
monitor scheduling information in a search space of the first cell based on the first search space configuration information or the second search space configuration information,
wherein:
in a case of cross carrier scheduling where the first cell is a scheduling cell and the second cell is a scheduled cell,
i) a number of physical downlink control channel (PDCCH) candidates and aggregation levels to be used on the first cell is determined based on a field in the second search space configuration information, and
ii) in the second search space configuration information, all optional fields are absent except the field.

14. The apparatus of claim 13, wherein the field informs a value of the number of PDCCH candidates for each aggregation level.

15. The apparatus of claim 13, wherein an identity (ID) of the search space of the first cell and an ID of a search space of the second cell are same as each other.

* * * * *